US011873967B2

(12) United States Patent
Adams et al.

(10) Patent No.: US 11,873,967 B2
(45) **Date of Patent: *Jan. 16, 2024**

(54) STAND LIGHT

(71) Applicant: MILWAUKEE ELECTRIC TOOL CORPORATION, Brookfield, WI (US)

(72) Inventors: Josh Adams, Milwaukee, WI (US); Emily C. Doberstein, San Diego, CA (US); Ross McIntyre, Milwaukee, WI (US); David Proeber, Milwaukee, WI (US); Duane W. Wenzel, Mukwonago, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/055,619

(22) Filed: Nov. 15, 2022

(65) Prior Publication Data

US 2023/0070557 A1 Mar. 9, 2023

Related U.S. Application Data

(63) Continuation of application No. 17/325,584, filed on May 20, 2021, now Pat. No. 11,512,820, which is a (Continued)

(51) Int. Cl.
*F21S 6/00* (2006.01)
*F21V 21/22* (2006.01)
(Continued)

(52) U.S. Cl.
CPC ............... *F21S 6/005* (2013.01); *F21S 6/006* (2013.01); *F21S 9/02* (2013.01); *F21V 11/16* (2013.01);
(Continued)

(58) Field of Classification Search
CPC .... F21S 6/005; F21S 6/006; F21S 9/02; F21L 4/04; F21V 11/16; F21V 21/22;
(Continued)

(56) References Cited

U.S. PATENT DOCUMENTS

| | | |
|---|---|---|
| 4,324,477 A | 4/1982 | Miyazaki |
| 4,390,933 A | 6/1983 | Warshawsky |

(Continued)

FOREIGN PATENT DOCUMENTS

| | | |
|---|---|---|
| CN | 103244913 | 9/2015 |
| CN | 206036765 U | 3/2017 |
| WO | 2002044503 | 6/2002 |

OTHER PUBLICATIONS

International Search Report and Written Opinion for Application No. PCT/US2018/054658 dated Jan. 29, 2019 (11 pages).

(Continued)

*Primary Examiner* — Peggy A Neils
(74) *Attorney, Agent, or Firm* — Michael Best & Friedrich LLP

(57) ABSTRACT

A stand light includes a body having a main center shaft and a sleeve movably supported on the main center shaft. The stand light additionally includes a head assembly supported by the main body and including a light source, and a plurality of legs pivotally coupled to the body. The plurality of legs is movable with the sleeve from a collapsed position to an extended position, in which distal ends of the plurality of legs are moved away from the body. A first leg of the plurality of legs includes a first handle portion and a second leg of the plurality of legs includes a second handle portion. When the plurality of legs is in the collapsed position, the first handle portion and the second handle portion are positioned adjacent to each other to form a handle configured to be grasped by a user.

20 Claims, 16 Drawing Sheets

Related U.S. Application Data continuation of application No. 16/876,470, filed on May 18, 2020, now Pat. No. 11,015,773, which is a continuation of application No. 16/153,291, filed on Oct. 5, 2018, now Pat. No. 10,690,304.

(60) Provisional application No. 62/569,317, filed on Oct. 6, 2017.

(51) Int. Cl.

| | |
|---|---|
| ***F21V 21/26*** | (2006.01) |
| ***F21V 23/06*** | (2006.01) |
| ***F21S 9/02*** | (2006.01) |
| ***F21V 11/16*** | (2006.01) |
| ***F21V 21/40*** | (2006.01) |
| ***F21Y 115/10*** | (2016.01) |
| ***F21Y 105/16*** | (2016.01) |
| ***F21V 21/30*** | (2006.01) |

(52) U.S. Cl.

CPC .............. *F21V 21/22* (2013.01); *F21V 21/26* (2013.01); *F21V 21/40* (2013.01); *F21V 23/06* (2013.01); *F21V 21/30* (2013.01); *F21Y 2105/16* (2016.08); *F21Y 2115/10* (2016.08)

(58) Field of Classification Search

CPC .......... F21V 21/26; F21V 21/40; F21V 23/06; F21V 21/30; F21Y 2105/16; F21Y 2115/10; F21W 2131/402

See application file for complete search history.

(56) References Cited

U.S. PATENT DOCUMENTS

| | | | |
|---|---|---|---|
| 4,989,123 A | 1/1991 | Best | |
| 5,400,234 A | 3/1995 | Yu | |
| 5,428,520 A | 6/1995 | Skief | |
| 5,630,660 A | 5/1997 | Chen | |
| 5,934,628 A | 8/1999 | Bosnakovic | |
| 5,964,524 A | 10/1999 | Qian | |
| 6,099,142 A | 8/2000 | Ju | |
| 6,213,626 B1 | 4/2001 | Qian | |
| 6,265,969 B1 | 7/2001 | Shih | |
| 6,386,738 B1 | 5/2002 | Staudacher | |
| 6,474,844 B1 | 11/2002 | Ching | |
| 6,554,459 B2 | 4/2003 | Yu et al. | |
| 6,637,904 B2 | 10/2003 | Hernandez | |
| 6,824,297 B1 | 11/2004 | Lee | |
| 6,854,862 B1 | 2/2005 | Hopf | |
| 6,873,249 B2 | 3/2005 | Chu | |
| 6,877,881 B2 | 4/2005 | Tsao | |
| 6,899,441 B2 | 5/2005 | Chen | |
| 6,902,294 B2 | 6/2005 | Wright | |
| 6,926,428 B1 | 8/2005 | Lee | |
| 7,001,044 B2 | 2/2006 | Leen | |
| 7,011,280 B2 | 3/2006 | Murray et al. | |
| 7,063,444 B2 | 6/2006 | Lee et al. | |
| 7,073,926 B1 | 7/2006 | Kremers et al. | |
| 7,152,997 B1 | 12/2006 | Kovacik et al. | |
| 7,195,377 B2 | 3/2007 | Tsai | |
| 7,224,271 B2 | 5/2007 | Wang | |
| 7,342,630 B2 | 3/2008 | Van Deursen et al. | |
| 7,364,320 B2 | 4/2008 | Van Deursen et al. | |
| 7,484,858 B2 | 2/2009 | Deighton et al. | |
| 7,503,530 B1 | 3/2009 | Brown | |
| 7,997,753 B2 | 8/2011 | Walesa et al. | |
| 8,007,145 B2 | 8/2011 | Leen | |
| 8,047,481 B2 | 11/2011 | Shen | |
| 8,087,797 B2 | 1/2012 | Pelletier et al. | |
| 8,142,045 B2 | 3/2012 | Peak | |
| 8,201,979 B2 | 6/2012 | Deighton et al. | |
| 8,262,248 B2 | 9/2012 | Wessel | |
| 8,328,398 B2 | 12/2012 | Deutsen | |
| 8,599,097 B2 | 12/2013 | Intravatola | |
| 8,651,438 B2 | 2/2014 | Deighton et al. | |
| 8,659,443 B2 | 2/2014 | Mandel | |
| 8,696,177 B1 | 4/2014 | Frost | |
| 8,801,226 B2 | 8/2014 | Moore | |
| 8,939,602 B2 | 1/2015 | Wessel | |
| 9,039,231 B1 | 5/2015 | Barker et al. | |
| 9,090,202 B2 | 7/2015 | McLoughlin et al. | |
| 9,091,401 B2 | 7/2015 | Wong et al. | |
| 9,170,006 B2 | 10/2015 | Cugini et al. | |
| 9,222,633 B2 | 12/2015 | Inskeep | |
| 9,303,853 B2 | 4/2016 | Deighton et al. | |
| 9,574,725 B2 | 2/2017 | Pellenc | |
| 10,551,043 B1 * | 2/2020 | Mullin | F21V 21/06 |
| 10,690,304 B2 | 6/2020 | Adams et al. | |
| 11,015,773 B2 | 5/2021 | Adams et al. | |
| 11,512,820 B2 * | 11/2022 | Adams | F21S 6/006 |
| 2002/0136005 A1 | 9/2002 | Lee | |
| 2002/0167814 A1 | 11/2002 | Chiang | |
| 2003/0090904 A1 | 5/2003 | Chiang | |
| 2003/0137847 A1 | 7/2003 | Cooper | |
| 2003/0174503 A1 | 9/2003 | Yueh | |
| 2005/0036308 A1 | 2/2005 | Wright | |
| 2006/0146550 A1 | 7/2006 | Simpson et al. | |
| 2006/0279948 A1 | 12/2006 | Tsai | |
| 2007/0252067 A1 | 11/2007 | Lee | |
| 2010/0142213 A1 | 6/2010 | Bigge et al. | |
| 2012/0140455 A1 | 6/2012 | Chang | |
| 2013/0058078 A1 | 3/2013 | Meng | |
| 2013/0265780 A1 | 10/2013 | Choski et al. | |
| 2013/0322073 A1 | 12/2013 | Hamm et al. | |
| 2014/0204218 A1 | 7/2014 | Gebhard et al. | |
| 2014/0218936 A1 | 8/2014 | Mahling et al. | |
| 2015/0192243 A1 | 7/2015 | Sharrah et al. | |
| 2016/0084431 A1 | 3/2016 | Chen et al. | |
| 2016/0161050 A1 | 6/2016 | Trebesius et al. | |
| 2016/0258601 A1 | 9/2016 | Gowanlock | |
| 2016/0298831 A1 | 10/2016 | Fang | |
| 2016/0312967 A1 | 10/2016 | Harvey et al. | |

OTHER PUBLICATIONS

Partial Supplementary European Search Report for Application No. 18864169.0 dated May 7, 2021 (16 pages).
Extended European Search Report for Application No. 188641690 dated Aug. 9, 2021 (14 pages).
Partial European Search Report for Application No. 23168714.6 dated Aug. 2, 2023 (15 pages).
Extended European Search Report for Application No. 23168714.6 dated Nov. 3, 2023 (12 pages).

* cited by examiner

STAND LIGHT

CROSS-REFERENCE TO RELATED APPLICATIONS

This application is a continuation of U.S. patent application Ser. No. 17/325,584, filed on May 20, 2021, now U.S. Pat. No. 11,512,820, which is a continuation of U.S. patent application Ser. No. 16/876,470, filed May 18, 2020, now U.S. Pat. No. 11,015,773, which is a continuation of U.S. patent application Ser. No. 16/153,291, filed Oct. 5, 2018, now U.S. Pat. No. 10,690,304, which claims priority to U.S. Provisional Patent Application No. 62/569,317, filed Oct. 6, 2017, the entire contents of all of which are incorporated by reference herein.

FIELD OF THE INVENTION

The present invention relates to work lights and, more particularly, to work lights including foldable stands.

SUMMARY

In one aspect, the invention provides a stand light including a body including a main center shaft and a sleeve movably supported on the main center shaft, a head assembly supported by the main body, the head assembly including a support arm, a light head coupled to the support arm, and a light source coupled to the light head, and a plurality of legs pivotally coupled to the body, the plurality of legs movable with the sleeve from a collapsed position to an extended position, in which distal ends of the plurality of legs are moved away from the body, wherein the light head is rotatable relative to the support arm about a first axis, wherein the light head includes a boss coupled to the support arm and a gasket positioned between the boss and the support arm, and wherein the gasket maintains the light head in any rotational position relative to the support arm.

In another aspect, the invention provides a stand light including a telescoping body including a main center shaft and an extension pole extendable out of the main center shaft, a head assembly supported by the extension pole, the head assembly including a light source, and a plurality of legs pivotally coupled to the body, the plurality of legs movable with the sleeve from a collapsed position to an extended position, in which distal ends of the plurality of legs are moved away from the body, wherein the telescoping body includes a detent mechanism having a first detent member coupled to a distal end of the main center shaft, and a second detent member coupled to a distal end of the extension pole and defining a recess, wherein the first detent member engages the recess to releasably secure the extension pole in an extended position.

In yet another aspect, the invention provides a stand light including a body including a main center shaft and a sleeve movably supported on the main center shaft, a head assembly supported by the extension pole, the head assembly including a light source, a plurality of legs pivotally coupled to the body, the plurality of legs movable with the sleeve from a collapsed position to an extended position, in which distal ends of the plurality of legs are moved away from the body, and a main housing coupled to an end of the body opposite from the head assembly, wherein the main housing includes a power port, wherein at least one of the plurality of legs includes a recess formed in a distal end of the at least one of the plurality of legs, and wherein the recess provides clearance for an extension cord connected to the power port.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 3:
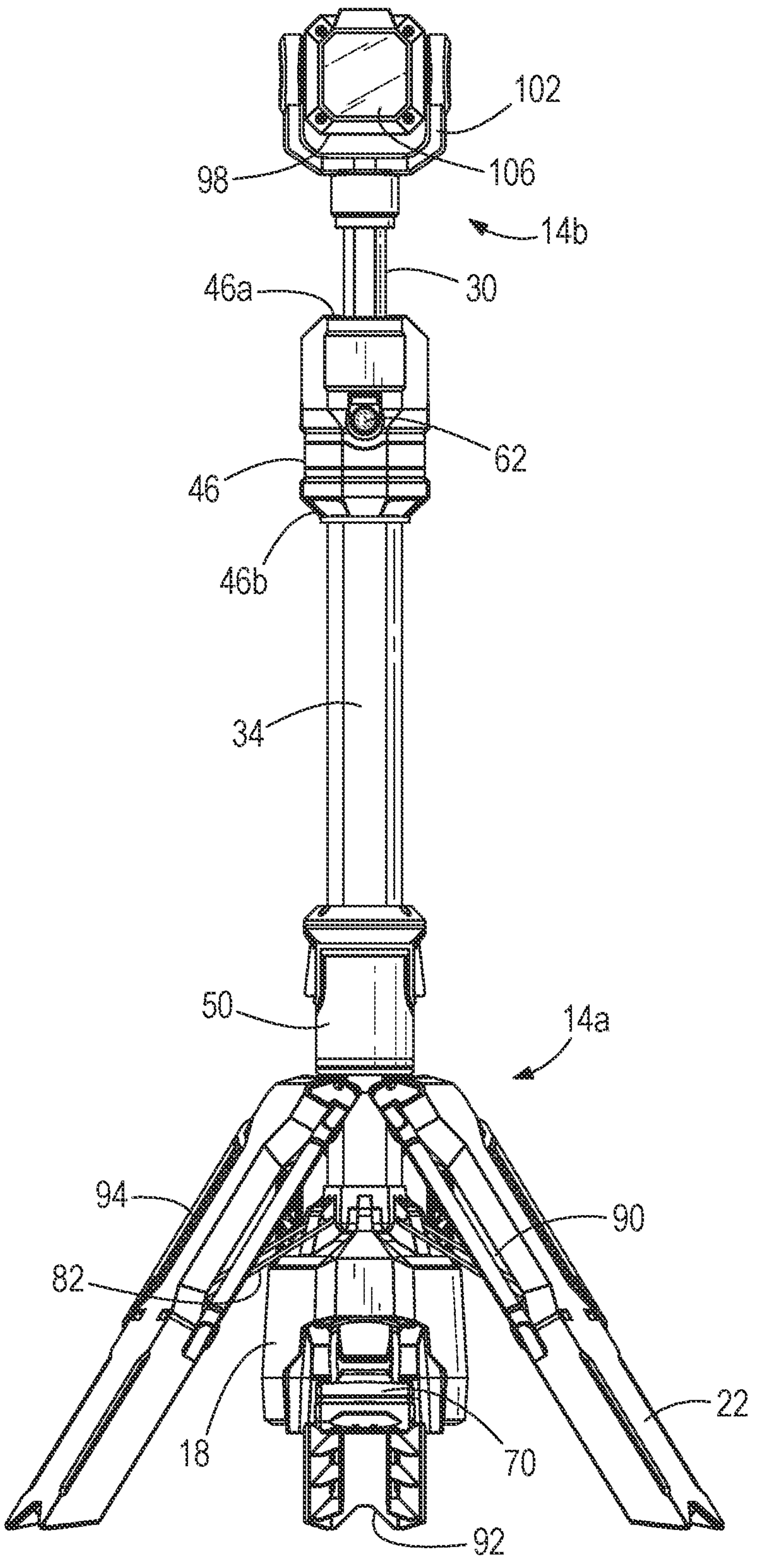
FIG. 3 is a side view of the stand light of FIGS. 1A-1D in an extended position.

FIGS. 1A-3 illustrate a stand light 10 according to one embodiment of the invention. The illustrated stand light 10 includes a body 14, a main housing 18, legs 22, and a head assembly 26. The stand light 10 is movable between a collapsed position (FIGS. 1A and 2A-2D) and multiple extended positions (FIGS. 1B, 1C, and 3). When in the collapsed position, the stand light 10 is relatively compact for storage and transport. When in one of the extended positions, the legs 22 of the stand light 10 are expanded so that the light 10 is self-supporting on a surface and the head assembly 26 may be extended away from the body 14.

Figures 1A, 1B, 1C:
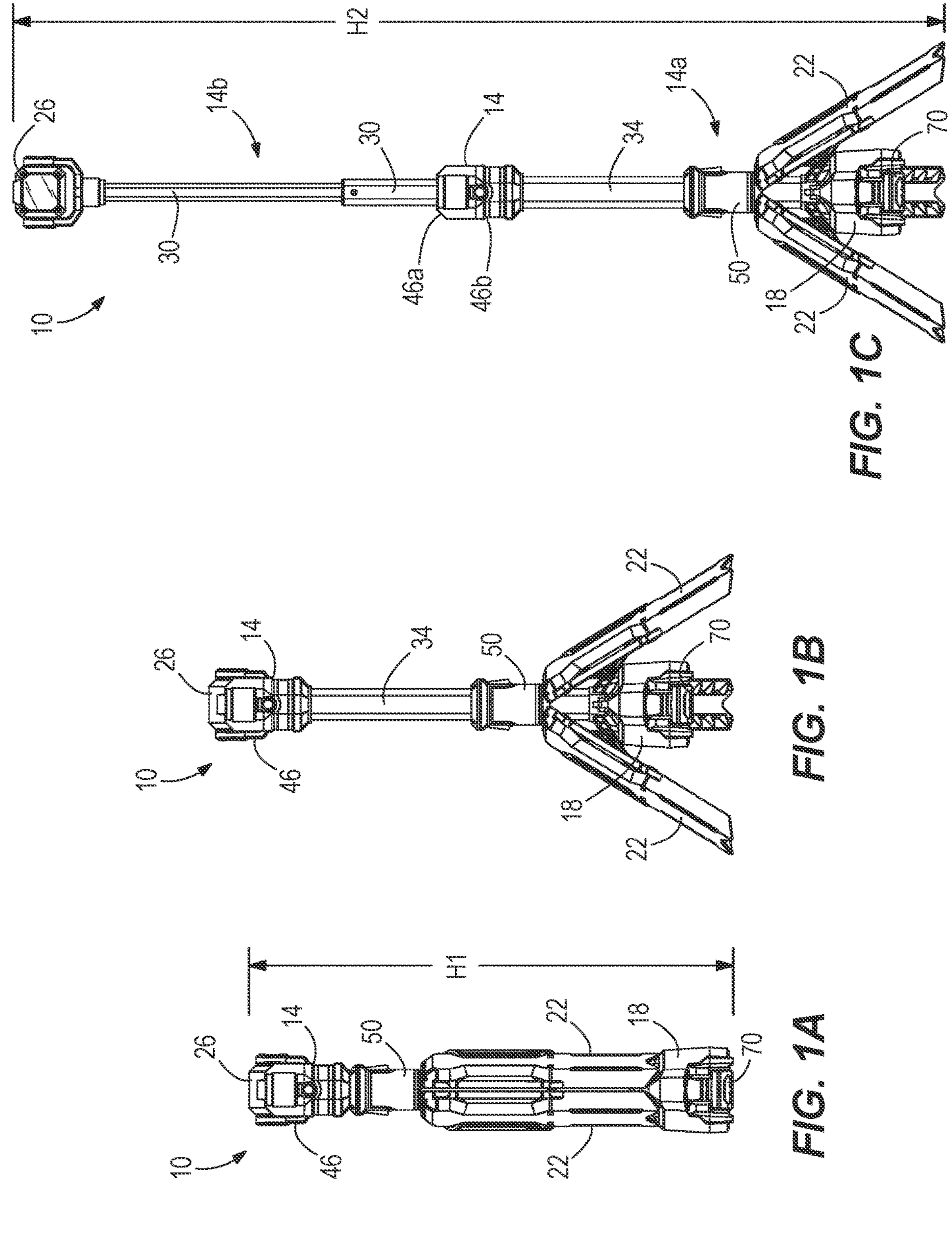
FIG. 1A is a side view of a stand light in a collapsed position, the stand light including legs and a head assembly.
FIG. 1B is a side view of the stand light with the legs in an extended position.
FIG. 1C is a side view of the stand light with the legs in the extended position and the head assembly in an extended position.
Figure 2A:
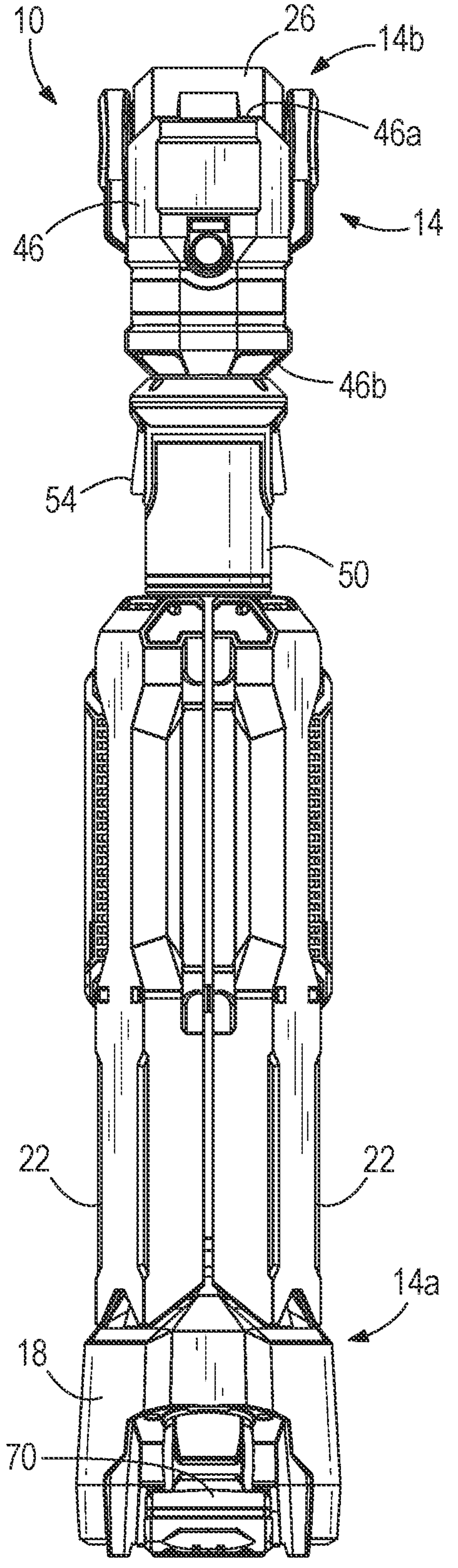
FIGS. 2A-2D are side views of the stand light of FIGS. 1A-1C in the collapsed position.
Figure 2B:
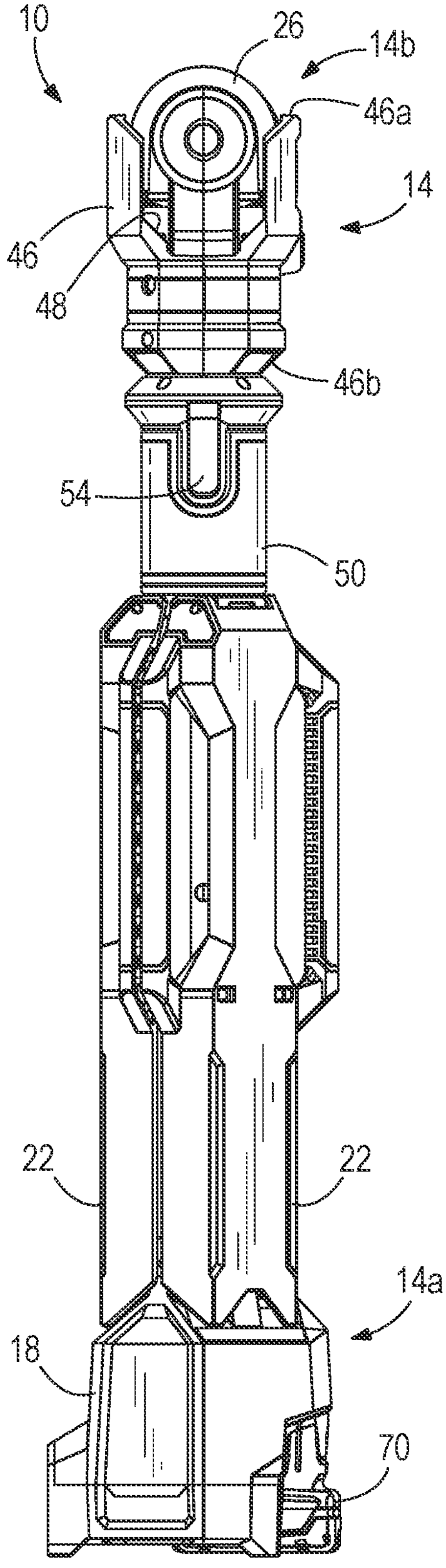
Figure 2C:
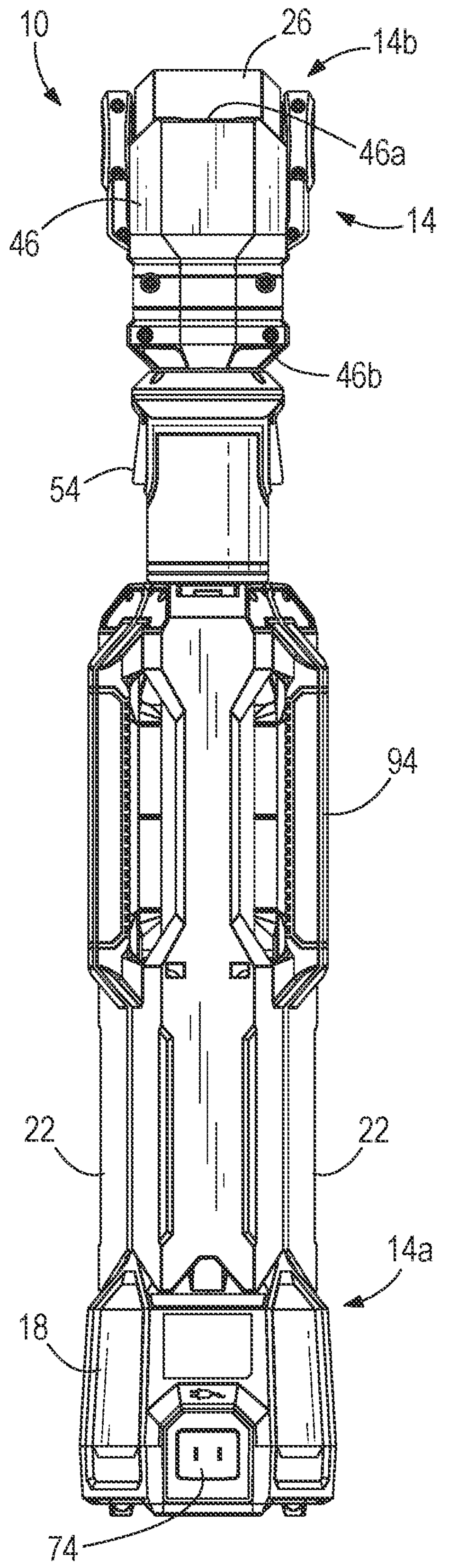
Figure 2D:
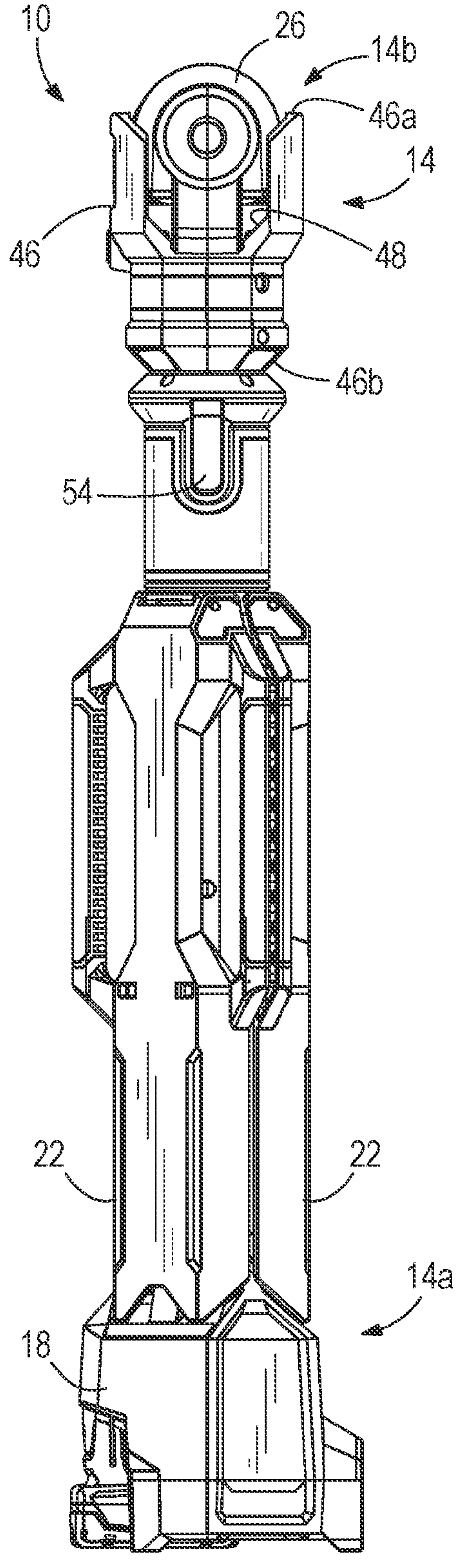

The illustrated body 14 is a telescoping body that includes extension poles 30 and a main center shaft 34 that allow the body 14 to extend in length. In the illustrated embodiment, the body 14 includes two extension poles 30 that slide into and out of the center shaft 34 and relative to each other to extend the length of the body 14. In other embodiments, the body 14 may include more than two extension poles 30. As shown in FIGS. 1A and 1C, the body 14 extends from a first, minimum height H1 (i.e., a collapsed position, FIG. 1A) to a second, maximum height H2 (i.e., an extended position, FIG. 1C). While in the collapsed position, the first height H1 is the most compact at approximately 30 inches, and while in the extended position, the second height H2 is approximately 60 inches. When in the collapsed position, the extension poles 30 are disposed in the main center shaft 34. The main center shaft 34 has the same cross-sectional shape as the extension poles 30 with a larger diameter, and allows the extension poles 30 to nest therein. In the illustrated embodiment, the main center shaft 34 and the extension poles 30 have generally hexagonal-shaped cross-sections. In other embodiments, the main center shaft 34 and the extension poles 30 may have other suitable cross-sectional shapes to inhibit relative rotation between the main center shaft 34 and the extension poles 30 (e.g., square, D-shaped, oblong, etc.), or the main center shaft 34 and the extension poles 30 may have generally circular cross-sections with anti-rotation features (e.g., ribs and grooves).

Figure 16:
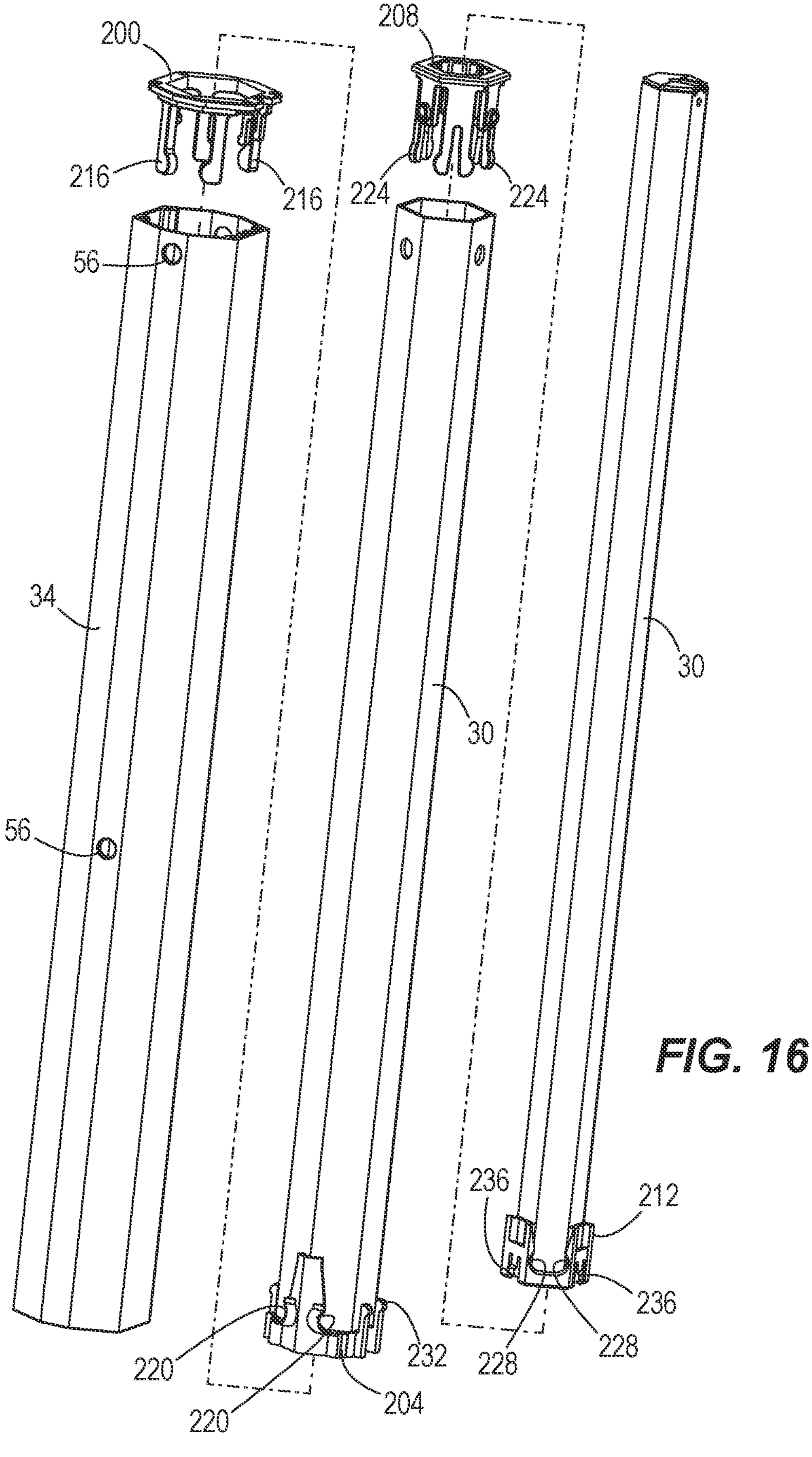
FIG. 16 is an exploded view of extension poles and a main center shaft of the stand light.

As shown in FIG. 16, the body 14 includes a detent mechanism to releasably secure the extension poles 30 in a maximum extended position. The illustrated detent mechanism includes a first detent member 200 coupled to an upper end of the main center shaft 34, a second detent member 204 coupled to a lower end of the middle extension pole 30, a third detent member 208 coupled to an upper end of the middle extension pole 30, and a fourth detent member 212 coupled to a lower end of the inner extension pole 30. The detent mechanism may include fewer or more detent members, depending on the number of extension poles 30. The first detent member 200 is secured to an inner surface of the main center shaft 34 and includes fingers 216 having enlarged heads. The second detent member 204 is secured to an outer surface of the middle extension pole 30 and defines recesses 220 configured to receive the enlarged heads of the fingers 216. The third detent member 208 is secured to an inner surface of the middle extension pole 30 and includes fingers 224 having enlarged heads. The fourth detent member 212 is secured to an outer surface of the inner extension pole 30 and defines recesses 228 configured to receive the enlarged heads of the fingers 224.

In operation, as the middle extension pole 30 is slid relative to the main center shaft 34 to move the lower end of the middle extension pole 30 adjacent the upper end of the main center shaft 34, the fingers 216 of the first detent member 200 contact the second detent member 204. The shape of the second detent member 204 causes the fingers 216 to deflect until the fingers 216 snap into the recesses 220 of the second detent member 204. In this position, the middle extension pole 30 is releasably secured in the extended position relative to the main center shaft 34. The fingers 216 can be released from the recesses 220 by exerting sufficient force to collapse the middle extension pole 30.

Similarly, as the inner extension pole 30 is slid relative to the middle extension pole 30 to move the lower end of the inner extension pole 30 adjacent the upper end of the middle extension pole 30, the fingers 224 of the third detent member 208 contact the fourth detent member 212. The shape of the fourth detent member 212 causes the fingers 224 to deflect until the fingers 224 snap into the recesses 228 of the fourth detent member 212. In this position, the inner extension pole 30 is releasably secured in the extended position relative to the middle extension pole 30. The fingers 224 can be release from the recesses 228 by exerting sufficient force to collapse the inner extension pole 30. With such an arrangement, the body 14 does not include manual actuators (e.g., cam locks) to release and secure the extensions poles 30 for sliding movement.

The body 14 can also extend to and be retained at any height (i.e., an intermediate position) between the first height (i.e., the collapsed position) and the second height (i.e., the maximum extended position). The extension poles 30 are maintained in position relative to each and to the main center shaft 34 by friction. In particular, the illustrated second detent member 204 and fourth detent member 212 include outwardly-projecting surfaces 232, 236 that engage inner surfaces of the main center shaft 34 and the middle extension pole 30 as the extension poles 30 are extended and collapsed. The outwardly-projecting surfaces 232, 236 create sufficient force to maintain the extension poles 30 in intermediate positions against the force of gravity. The first detent member 200 and the second detent member 208 may also or alternatively include inwardly-projecting surfaces that engage outer surfaces of the extensions poles 30 to maintain the extension poles in intermediate positions. In other embodiments, the body 14 may include additional detent members to releasably secure the extension poles 30 in discrete intermediate positions.

Alternative mechanisms may additionally be implemented in order to hold the extension poles 30 in place. For example, the poles 30 may include friction plates to inhibit the poles 30 from falling due to gravity, but that could be overcome with sufficient force by a user. In further embodiments, the extension poles 30 may include a cam adjustment mechanism to selectively tension and release two or more poles 30 of the body 14 to allow adjustment of height. In some embodiments, plastic spacers may be positioned between the extension poles 30 to create friction so the extension poles 30 will not automatically retract when the cam adjustment is opened.

In alternative embodiments, one extension pole 30 may include an actuator (e.g., button), and another extension pole 30 of a larger diameter may include a recess. When the extension poles 30 are extended to a desired length, the actuator may engage the recess, locking the poles 30 in place. In order to collapse the poles 30, a user may depress the actuator, thereby releasing the actuator from engagement with the recess and collapsing the light assembly 10. In still another embodiment, the extension poles 30 may include only a friction plate to maintain the poles 30 position with infinite adjustment.

Figure 4:
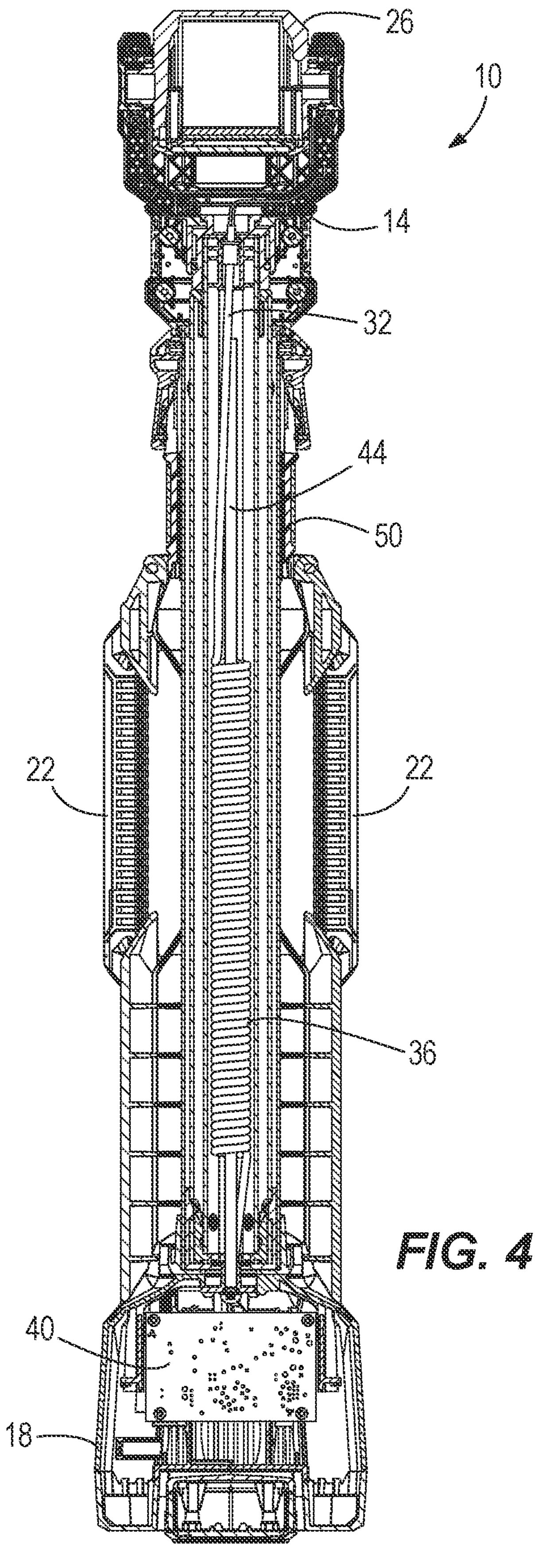
FIG. 4 is a cross-sectional view of the stand light in the collapsed position.

As shown in FIG. 4, an electrical cord 32 is positioned within and extends through the extension poles 30. The electrical cord 32 connects the head assembly 26 to the main housing 18 to provide power to the head assembly 26. More specifically, the electrical cord 32 extends between the light head assembly 26 and a circuit board 40 of the light 10. In the illustrated embodiment, the electrical cord 32 includes a coiled portion 36. The coiled portion 36 wraps a rigid guide tube 44 extending throughout the extension poles 30 and allows the cord 32 to expand and contract during extension and collapsing of the light stand 10. For example, when the light 10 is moved into one of the extended positions, the coiled portion 36 of the electrical cord 32 may expand, and when the light 10 is moved into the collapsed position, the coiled portion 36 of the electrical cord 32 may retract. The rigid guide tube 44 provides support for the coiled portion 36 so the coiled portion 36 does not bend out of alignment or kink during extension and retraction. Additionally, the coiled portion 36 allows for the light head assembly 26 to be rotated without causing substantial damage to the cord 32.

As shown in FIGS. 2A-2D and 6, the body 14 includes a light shroud 46 secured to the main center shaft 34 at a fixed distance from the main housing 18. The extension poles 30 extend from a first end **46*a* of the light shroud 46 and the main center shaft 34 extends from a second end 46*b* of the light shroud 46. The first end 46*a* of the light shroud 46 defines an area for supporting the head assembly 26. More specifically, the first end 46*a* of the light shroud 46 includes cutouts 48, or apertures, positioned on opposite sides of the shroud 46. The cutouts 48 extend through the first end 46*a* of the shroud 46 and are shaped to receive and provide clearance for arms 102 of the light head assembly 26 when the light 10 is in the collapsed position. As such, when the light 10 is collapsed, the light head assembly 26 is seated within and partially surrounded by the shroud 46. In alternative embodiments, the shroud 46 may fully surround the arms 102 of the light head assembly 26 rather than providing cutouts 48. In still further embodiments, the first end 46*a* of the light shroud 46 may include mechanisms (e.g., latches, detents, notches, etc.) for releasably securing the head assembly 26 within the shroud 46 when the stand light 10 is fully collapsed. In some embodiments, the head assembly 26 and the shroud 46 may be keyed to one another to position the head assembly 26 relative to the shroud 46 and to inhibit the head assembly 26 from rotating relative to the shroud 46**.

As shown in FIGS. 2A-2D and 3, the body 14 further includes a sleeve 50. The sleeve 50 surrounds a portion of the main center shaft 34 and is movable relative to the main center shaft 34. In the illustrated embodiment, the sleeve 50 is slidable along the main center shaft 34 toward and away from the light shroud 46. Ends of the legs 22 are coupled to the sleeve 50 for movement with the sleeve 50 between extended and collapsed positions. When the stand light 10 moves to the extended position, the sleeve 50 moves axially away from the light shroud 46, causing the legs 22 to move away from the main housing 18. When the stand light 10 moves to the collapsed position, the sleeve 50 moves axially toward the light shroud 46, causing the legs 22 to move toward the main housing 18.

Figure 5:
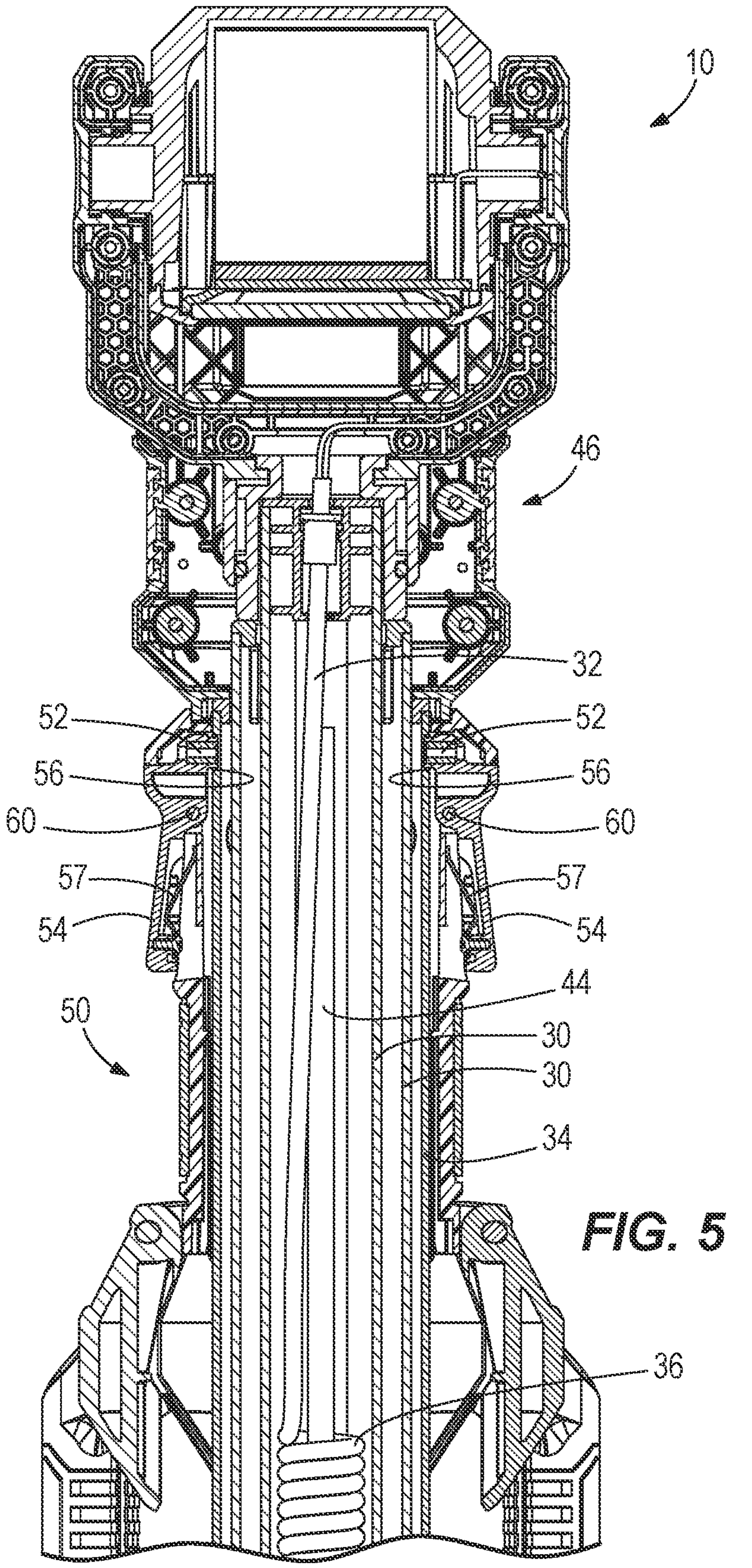
FIG. 5 is a cross-sectional view of a portion of the stand light.

As shown in FIG. 5, the sleeve 50 includes one or more actuators 54. In the illustrated embodiment, the sleeve 50 includes two actuators 54 positioned on opposite sides of the sleeve 50. The illustrated actuators 54 are buttons that are movably coupled to the sleeve 50, but may alternatively be other types of suitable actuators. The actuators 54 are pivotable relative to the sleeve 50 about pivot axes defined by corresponding pivot pins 60. The actuators 54 are operable to hold the stand light 10 in either the collapsed position or one of the extended positions. Each actuator 54 includes a projection 52. The projections 52 are configured to engage apertures 56 formed in the main center shaft 34. The illustrated actuators 54 are biased into engaged positions so the projections 52 are received in the apertures 56, but are manually actuatable (e.g., depressible) to move the projections 52 out of the apertures 56. In the illustrated embodiment, the actuators 54 are biased by leaf springs 57. In other embodiments, the actuators 54 may be biased by other suitable springs, such as torsion springs, compressions springs, and the like.

When the light 10 is in the collapsed positon so the sleeve 50 is adjacent the light shroud 46 (FIG. 1A), the projections 52 extend into apertures 56 formed in the main center shaft 34 near the light shroud 46 to lock the sleeve 50 in the collapsed position. The actuators 54 may be actuated to disengage the projections 52 from the apertures 56, allowing the sleeve 50 to slide along the main center shaft 34 away from the light shroud 46 and causing the legs 22 to move toward the extended position. When the light 10 is in the extended position so the sleeve 50 is adjacent the main housing 18 (FIG. 1B), the projections 52 extend into apertures 56 formed in the main center shaft 34 near the main housing 18 to lock the sleeve 50 in the extended position. The actuators 54 may again be actuated to disengage the projections 52 from the apertures 56, allowing the sleeve 50 to slide along the main center shaft 34 toward the light shroud 46 and causing the legs 22 to move toward the collapsed position.

To disengage the projections 52 from the apertures 56 and move the sleeve 50, both actuators 54 need to be actuated at the same time. In the illustrated embodiment, the actuators 54 are positioned on diametrically opposite sides of the sleeve 50, but are designed so a user can engage and actuate both actuators 54 simultaneously with a single hand. For example, the actuators 54 have relatively large engagement areas that can be depressed by a user's thumb, a user's fingers, and/or a user's palm to actuate the actuators 54. With such an arrangement, a can grasp the sleeve 50 and actuate the actuators 54 with one hand, while grasping the light shroud 46 (or other suitable structure of the light 10) with the other hand, to move the sleeve 50 along the main center shaft 34, thereby extending or collapsing the legs 22.

Figure 6:
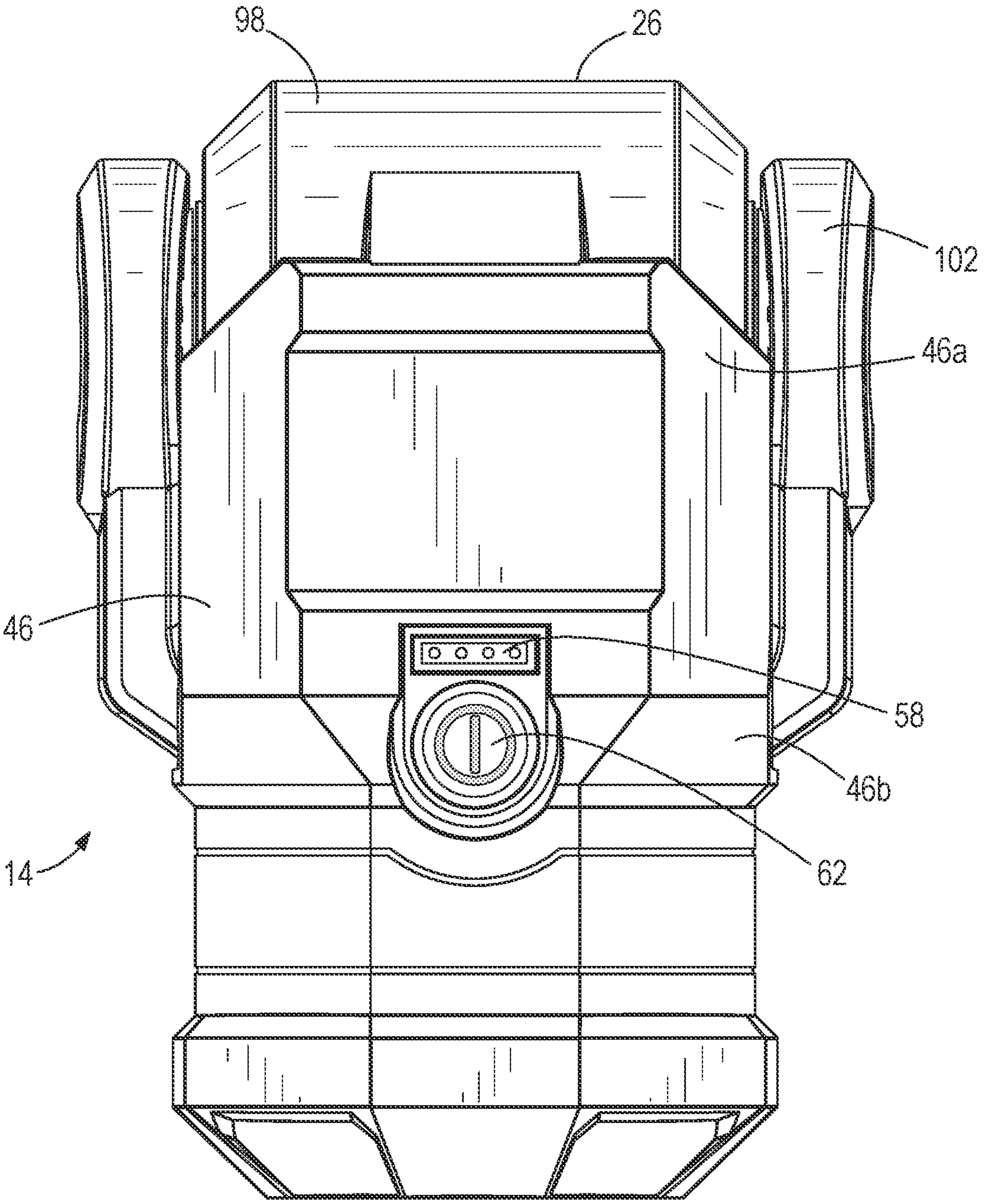
FIG. 6 is a side view of a shroud and the head assembly of the stand light.

As illustrated in FIG. 6, the light 10 further includes a fuel gauge 58 and a power button 62. The illustrated fuel gauge 58 and power button 62 are supported on the light shroud 46. In other embodiments, the fuel gauge 58 and the power button 62 may alternatively be positioned elsewhere on the light 10.

The fuel gauge 58 includes lights or LEDs 66 to display an amount of charge remaining in a battery pack 70 (FIGS. 1A-1C) connected to the light 10. In the illustrated embodiment, the fuel gauge 58 includes four LEDs 66 to indicate four different charge levels of the battery pack 70. For example, four illuminated LEDs 66 may indicate a battery charge status of 100%, three illuminated LEDs 66 may indicate a battery charge status of 75%, two illuminated LEDs 66 may indicate a battery charge status of 50%, one illuminated LED 66 may indicate a battery charge status of 25%, and zero illuminated LEDs 66 may indicate a battery charge status of 0%.

The power button 62 is operable to change the light 10 between various states, such as high power, low power, and off. In the illustrated embodiment, depressing the power button 62 for a predetermined, extended period of time will turn off the stand light 10, no matter which state is activated as the power button 62 is depressed. In further embodiments, the light 10 may include more or less than two additional states. For example, the light 10 may include a separate actuator to change the light between various intensity states. In further alternative embodiments, the light 10 may include an intensity indicator to display which the intensity state of the light 10.

As shown in FIGS. 3 and 7-10, the main housing 18 is supported at a first end 14*a* of the body. The main housing 18 is configured to support the battery pack 70 to power the light 10. More specifically, the main housing 18 includes a battery receptacle 78 for receiving the battery pack 70. In the illustrated embodiment, the battery pack 70 is a rechargeable power tool battery pack, such as a 12V Li-ion battery pack.

Figure 7:
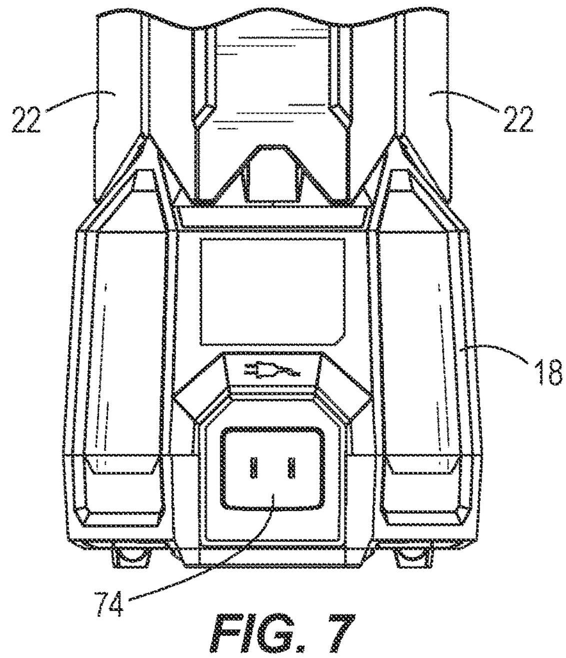
FIG. 7 is an enlarged view of a main housing of the stand light, illustrating a power outlet port.
Figure 8:
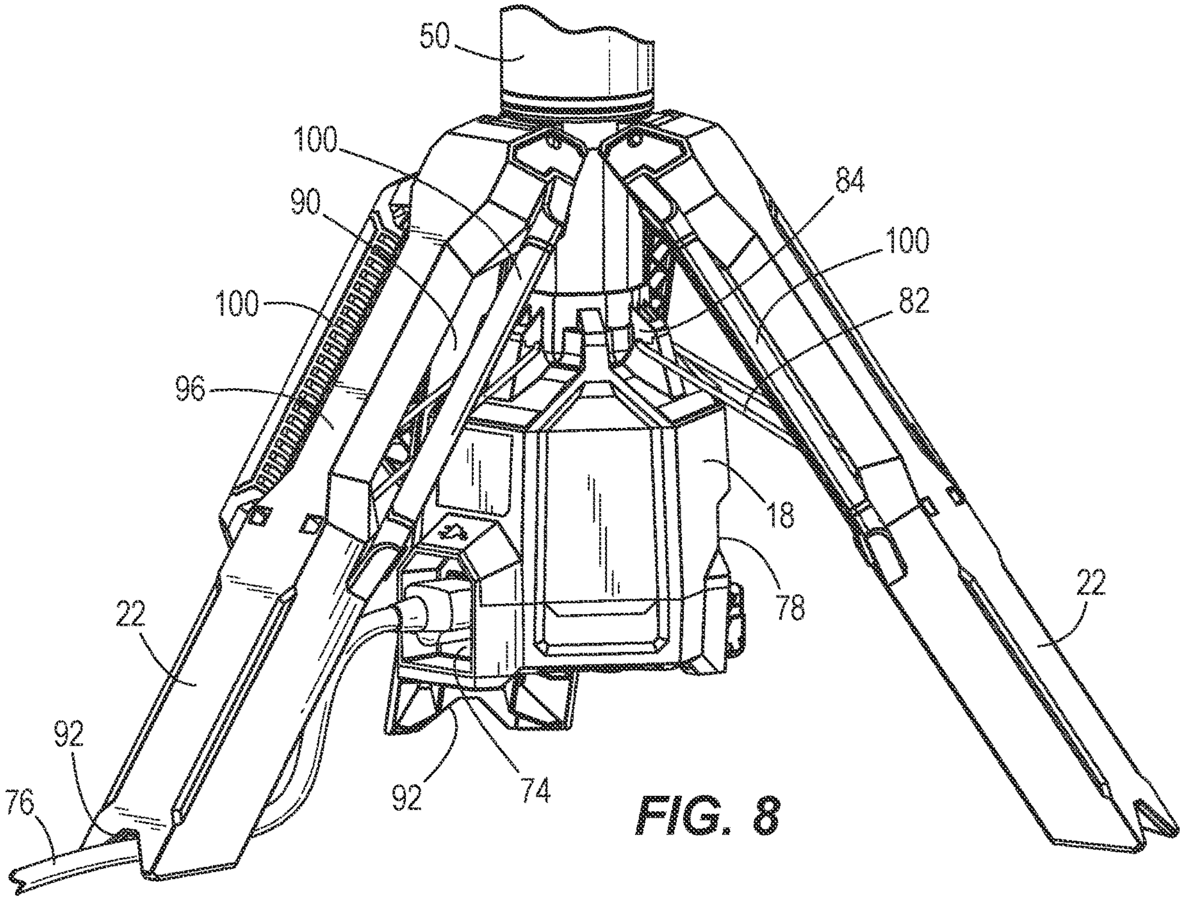
FIG. 8 is a perspective view of a lower portion of the stand light, illustrating the legs in the extended position and an extension cord connected to the power port.
Figure 9:
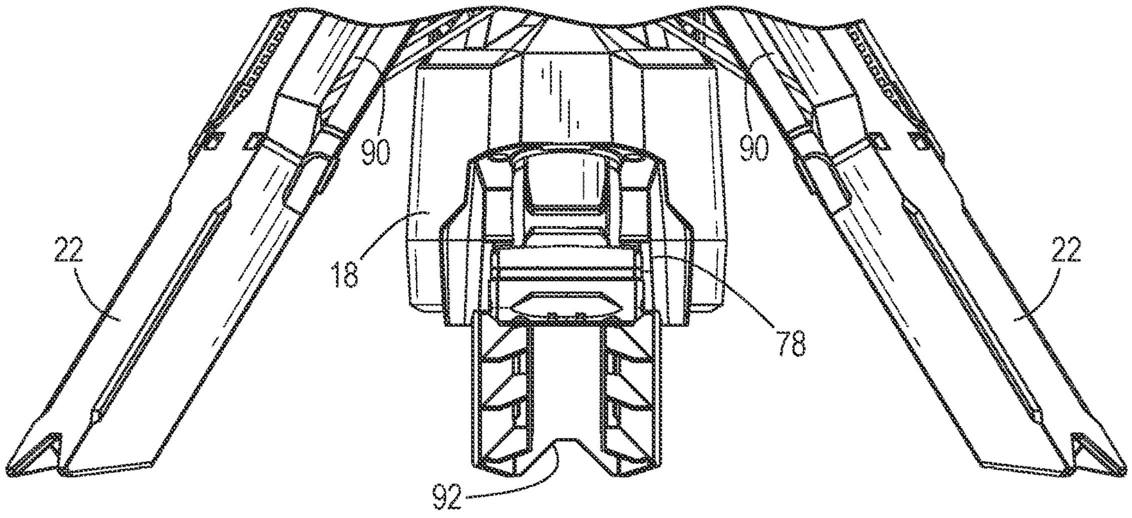
FIG. 9 is a side view of the lower portion of the stand light, illustrating a battery pack connected to the main housing.

As shown in FIGS. 7 and 8, the main housing 18 further includes a power port 74. The illustrated power port 74 is an input port, such as an AC power input port. The power port 74 can connect to, for example, an extension cord 76 for powering the light 10 via an AC power source. In some embodiments, the main housing 18 may also or alternatively include a power output port. The output port allows another device (e.g., a light, a power tool, etc.) to be plugged into the light 10 to power the another device. In such embodiments, multiple devices can be daisy-chained together.

Figure 10:
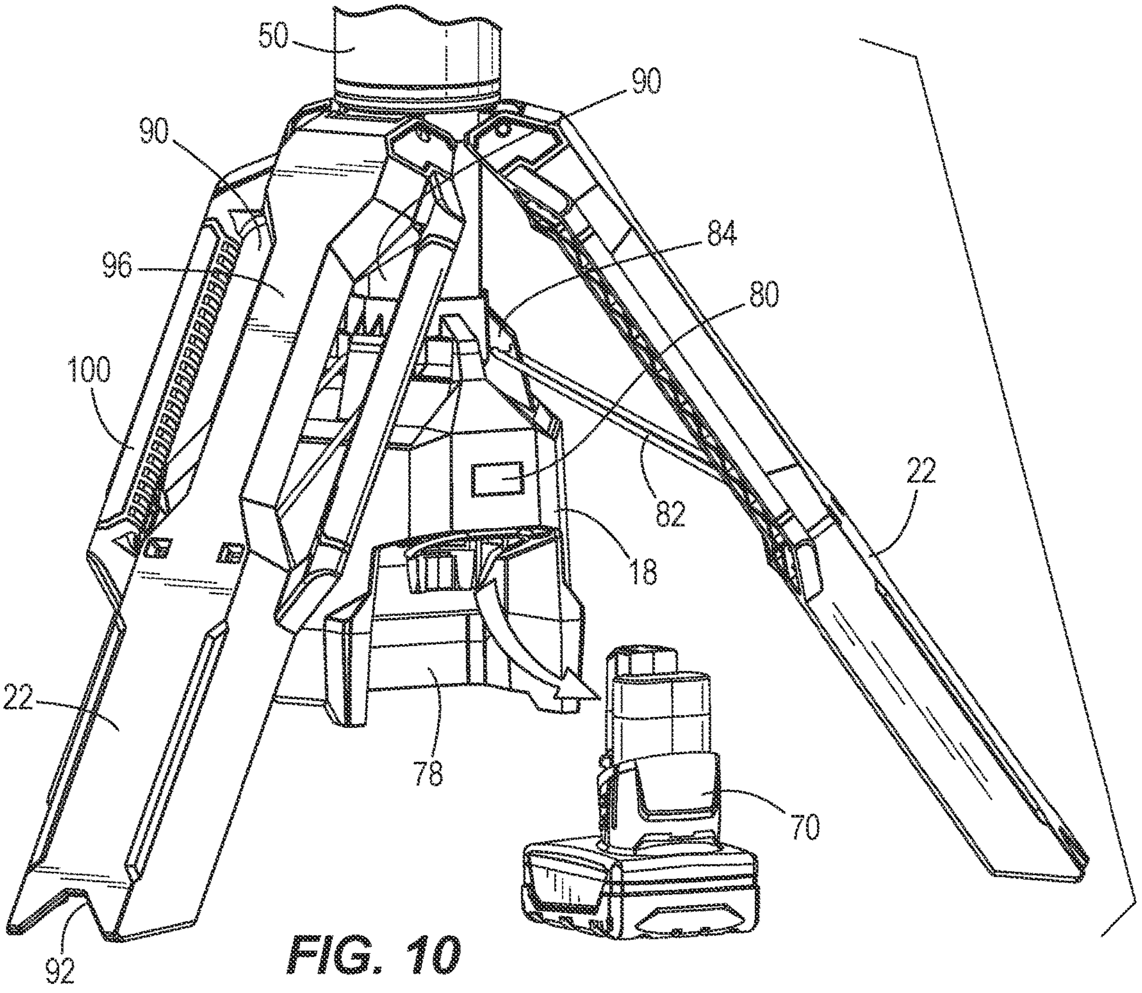
FIG. 10 is a perspective view of the lower portion of the stand light, illustrating the battery pack removed from the main housing.

As shown in FIG. 10, the illustrated main housing 18 also supports a charging circuit 80. The charging circuit 80 electrically couples the power inlet port 74 to the battery pack 70 to charge the battery pack 70. If both the battery pack 70 and an AC power source are connected to the light, the AC power source will charge the battery pack 70 and power the light 10. When the AC power source is disconnected from the light 10, the battery pack 70, if sufficiently charged, will automatically begin powering the light 10.

Referring back to FIGS. 1A-1C, the legs 22 are pivotally coupled to the body 14 for movement between the collapsed position (FIG. 1A) and the extended position (FIGS. 1B and 1C). More particularly, a first or proximal end of each leg 22 is pivotally coupled to the sleeve 50, and a second or distal end of each leg 22 is configured to contact the ground or other surface supporting the light 10. As the legs 22 move from the collapsed position to the extended position, the distal ends of the legs 22 move away from the body 14. In the illustrated embodiment, the stand light 10 includes three legs 22. In other embodiments, the stand light 10 may include fewer or more legs 22. In some embodiments, the legs 22 can telescope to lengthen or shorten independently of one another. For example, when the light 10 is placed on an uneven surface, each leg 22 can adjust to a different length in order to support the light 10.

As shown in FIGS. 8 and 10, a leg link 82 extends between each of the legs 22 and the body 14 to limit the movement of the legs 22. In the illustrated embodiment, the leg links 82 are wireforms. The leg links 82 extend from the backside of the legs 22 to a flange 84 protruding from the main body 18. Each of the legs 22 includes two leg links 82 such that each leg link 82 extends from either side of the flange 84. In some embodiments, each set of two leg links 82 may be integrally formed as a U-shaped leg link.

At least one of the legs 22 includes a recess 92, or cutout, formed in the distal end of the leg 22. The recess 92 provides clearance for the extend cord 76 (FIG. 8) to pass under the leg 22 and connect to the power inlet port 74. Specifically, at least the leg 22 aligned on the same side of the light 10 as the power inlet port 74 includes the recess 92. In the illustrated embodiment, all three legs 22 include recesses 92. In other embodiments, only one or some of the legs 22 may include the recess 92.

Figure 11:
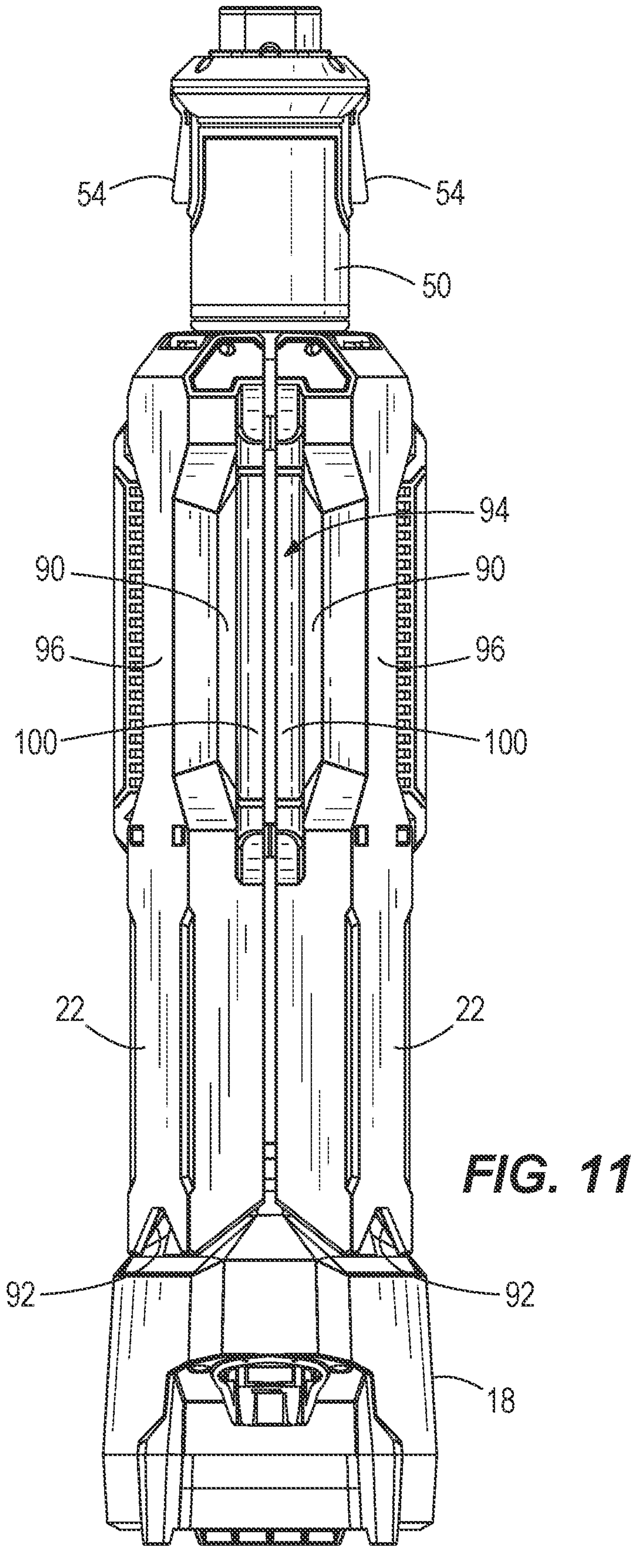
FIG. 11 is a perspective view of the lower portion of the stand light, illustrating the legs forming a handle.

As shown in FIG. 11, each of the legs 22 includes a central portion 96 extending down the center of the leg 22 and two apertures 90 spaced on either side of the central portion 96. The apertures 90 extend through the leg 22 and form side portions 100 extending away from the body 14. More specifically, the central portion 96 and side portions 100 are angled, or curved, away from the main body 14, such that the apertures 90 are large enough to receive a user's hand. When in the collapsed position, the side portions 100 of two adjacent legs 22 are brought next to each other to form one, continuous leg handle 94. A user may slide her hand through one of the apertures 90 of each adjacent leg 22 and grasp the handle 94 in order to carry the light 10. Because the handle 94 is formed from two separate legs 22, the user holding the handle 94 causes the legs 22 to remain in the collapsed position. In other words, the two adjacent legs 22 cannot move apart from each and toward the extended position.

In the illustrated embodiment, each of the legs 22 includes a main portion 96, two apertures 90, and two side portions 100. Therefore, when the light 10 is in the collapsed position, the light 10 includes three separate handles 94 formed by pairs of adjacent legs 22. The handles 94 are spaced apart circumferentially around the body 14. However, in alternative embodiments, only two of the legs 22 may include a main portion 96, apertures 90, and two side portions 100, therefore creating only one handle 94. In alternative embodiments, the legs 22 may additionally or alternatively include a handle formed only on one of the legs 22.

Figure 17:
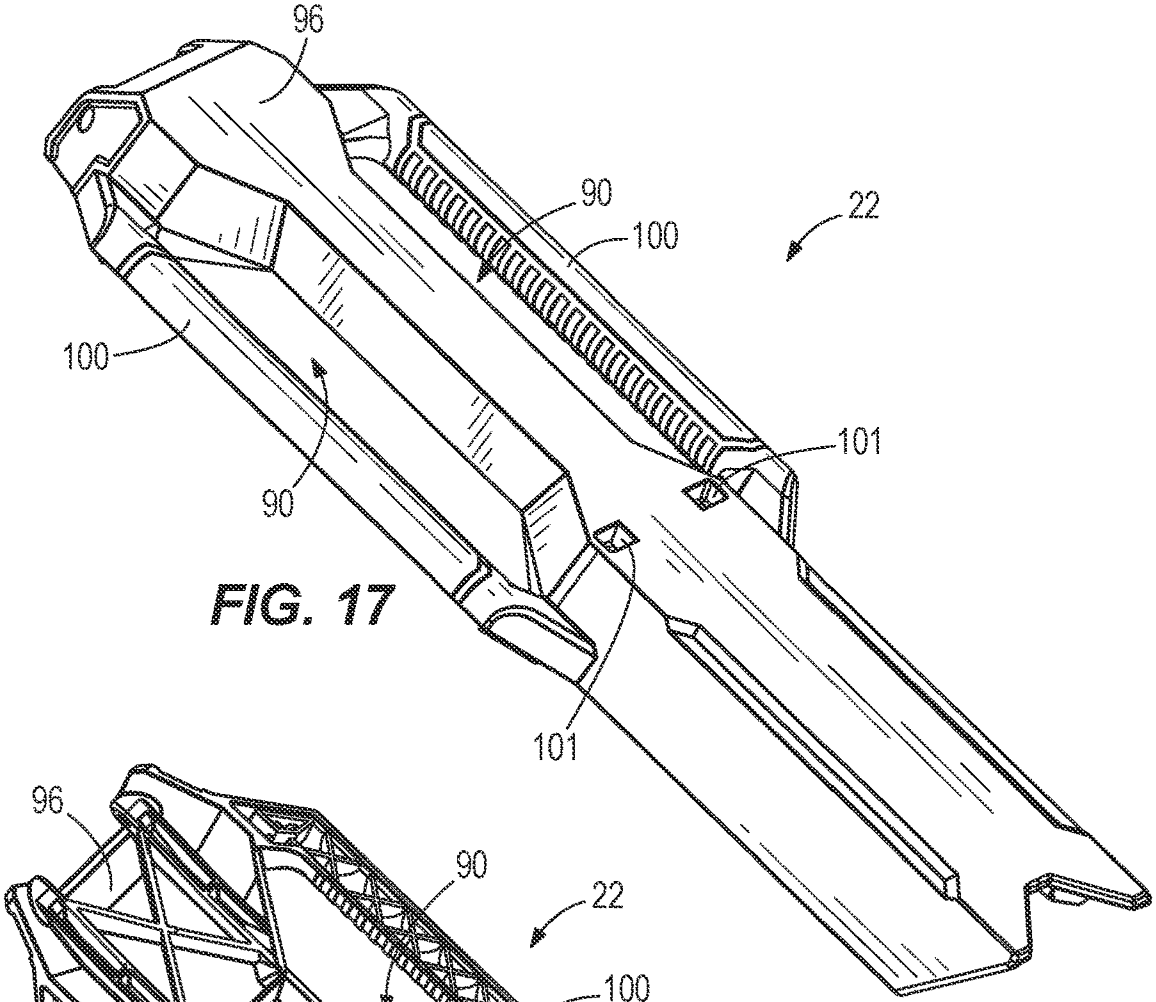
FIG. 17 is a front perspective view of one of the legs of the stand light.
Figure 18:
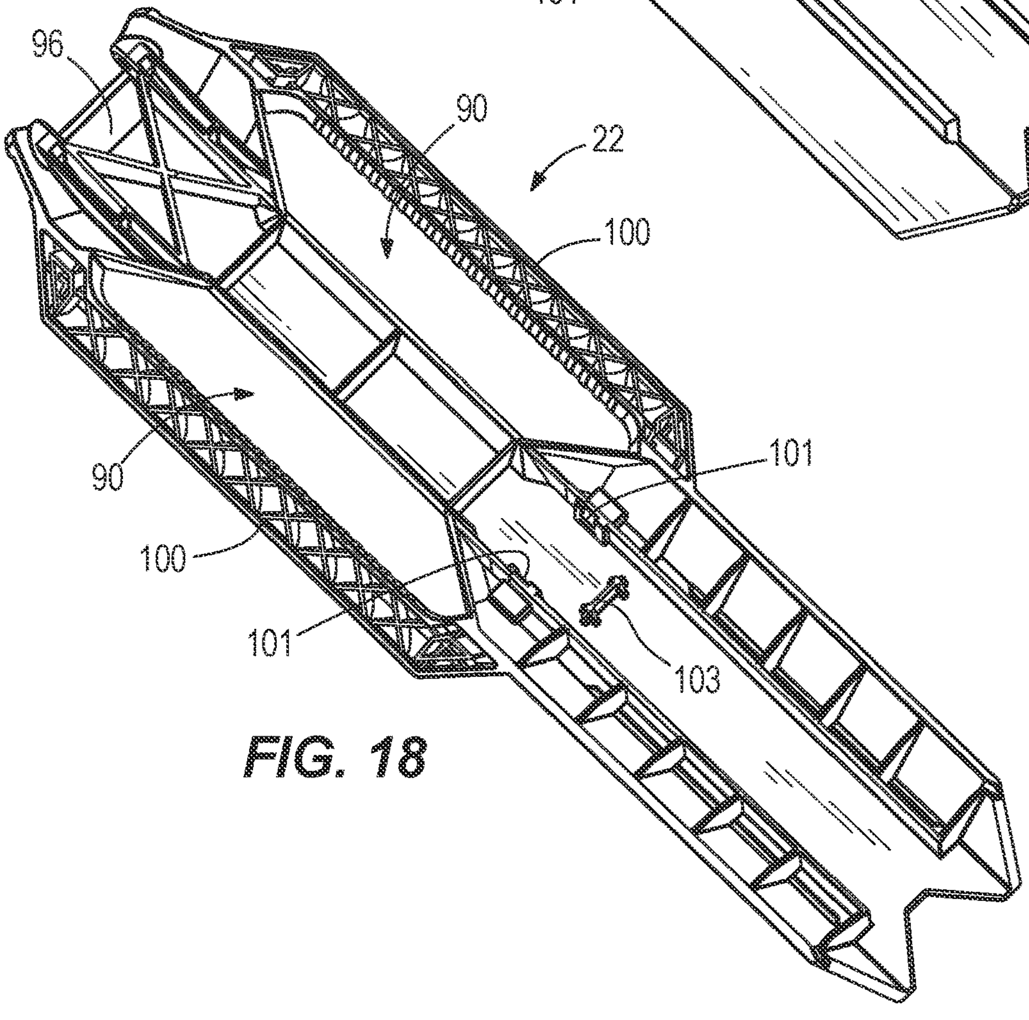
FIG. 18 is a rear perspective view of one of the legs of the stand light.

FIGS. 17 and 18 illustrate one of the legs 22 in more detail. Each side portion 100 includes a grip surface having features (e.g., ribs) configured to facilitate grasping and carrying the light 10 by the handles 94. In addition, the main portion 96 includes apertures 101 that receive ends of the corresponding leg link 82. A projection 103 is formed on the inner surface of the main portion 96, between the apertures 101. The projection 103 helps maintain the leg link 82 within the apertures 101 when, for example, the legs 22 are in the collapsed positon for storage or transport. In particular, the projection 103 blocks the legs link 82 from bending or deflecting inward and popping out of the apertures 101. In the illustrated embodiment, the projection 103 is integrally formed as a single piece (e.g., molded) on the inner surface of the leg 22. In other embodiments, the projection 103 may be a separately piece that is permanently coupled to the inner surface of the leg 22.

In alternative embodiments, the legs 22 of the light 10 may automatically deploy by a release mechanism triggered when the main housing 18 is set on a support surface. Using the release mechanism or an alternate adjustment mechanism, a user may manually adjust the height and position of the legs 22 relative to the main housing 18. In some embodiments, when the user lifts up on the main housing 18, a handle mechanism (e.g., used to transport the area light and stand light), or the release mechanism, the legs 22 automatically expand into the extended position. Upon deployment of the release mechanism, the legs 22 will not deploy into a locked position until the head assembly 26 is moved away from the light shroud 46. For example, a user sets the light 10 on a support surface and depresses the automatic release mechanism. Then, the legs 22 will extend, and the user will have to manually slide the extension poles 30 to the desired position.

Figure 12A:
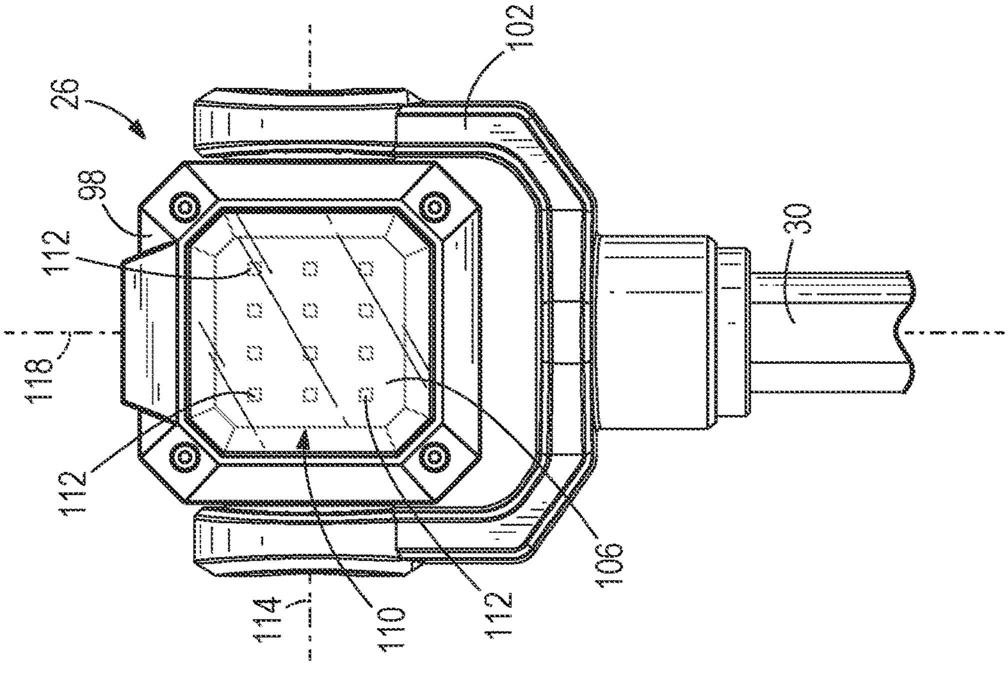
FIG. 12A is a front view of the head assembly of the stand light.
Figure 12B:
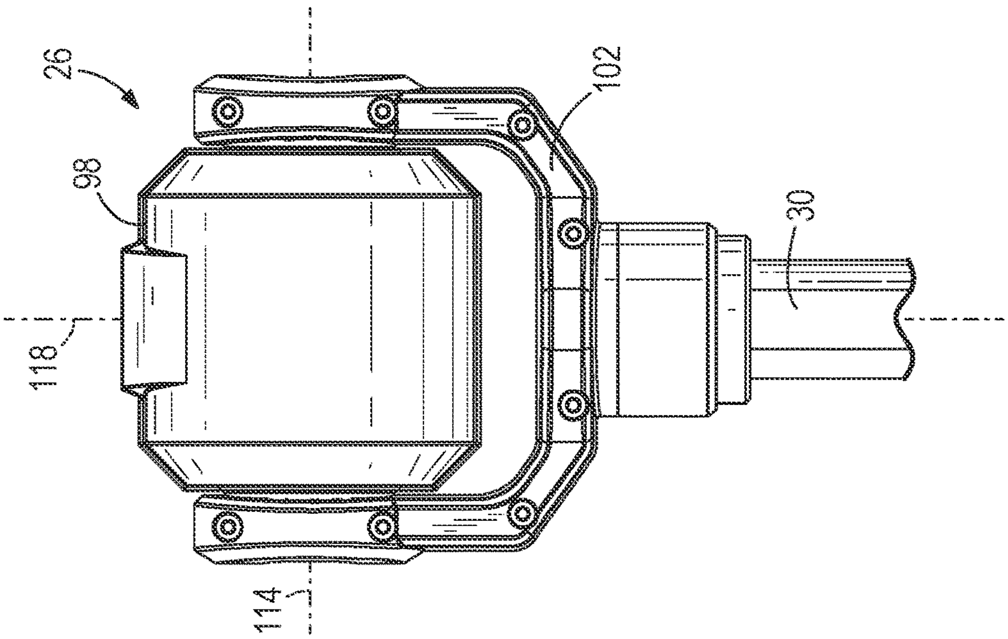
FIG. 12B is a rear view of the head assembly of the stand light.
Figure 12C:
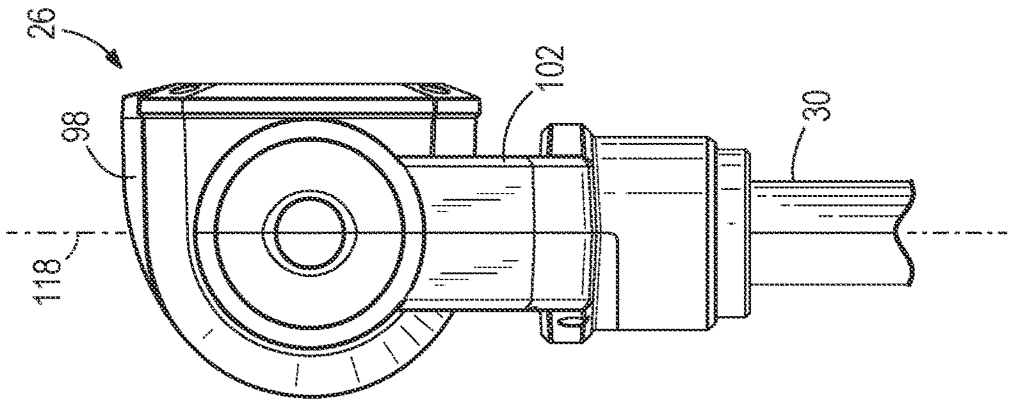
FIG. 12C is a side view of the head assembly of the stand light.

FIG. 12A-12C illustrate the head assembly 26 of the stand light 10. The head assembly 26 is supported on a second end 14*b* of the body opposite the main housing 18. The head assembly 26 includes a main light head 98, a support arm 102, a lens 106, and a light source 110. In the illustrated embodiment, the light source 110 includes a plurality of light emitting diodes 112 (LEDs) arranged in a grid. The light emitting diodes 112 are coupled to a heat sink 113 (FIG. 15) positioned within the light head 98. In other embodiments, the light source 110 may include other suitable types of light sources, such as incandescent bulbs, halogen bulbs, and the like.

The light head 98 is semi-circularly shaped, such that the portion of the light head 98 including the lens 106 is substantially flat. Additionally, the lens 106 is substantially rectangular with beveled edges. However, in alternative embodiments, the light head 98 and the lens 106 may include other shapes (e.g., circular, square, etc.).

The support arm 102 is coupled to an end of the uppermost extension pole 30 opposite the light shroud 46. The support arm 102 surrounds and supports the light head 98 and forms a generally U-shaped bracket. In the illustrated embodiment, the support arm 102 surrounds the bottom and sides of the light head 98. However, in alternative embodiments, the support arm 102 may cover more or less of the light head 98.

Figure 15:
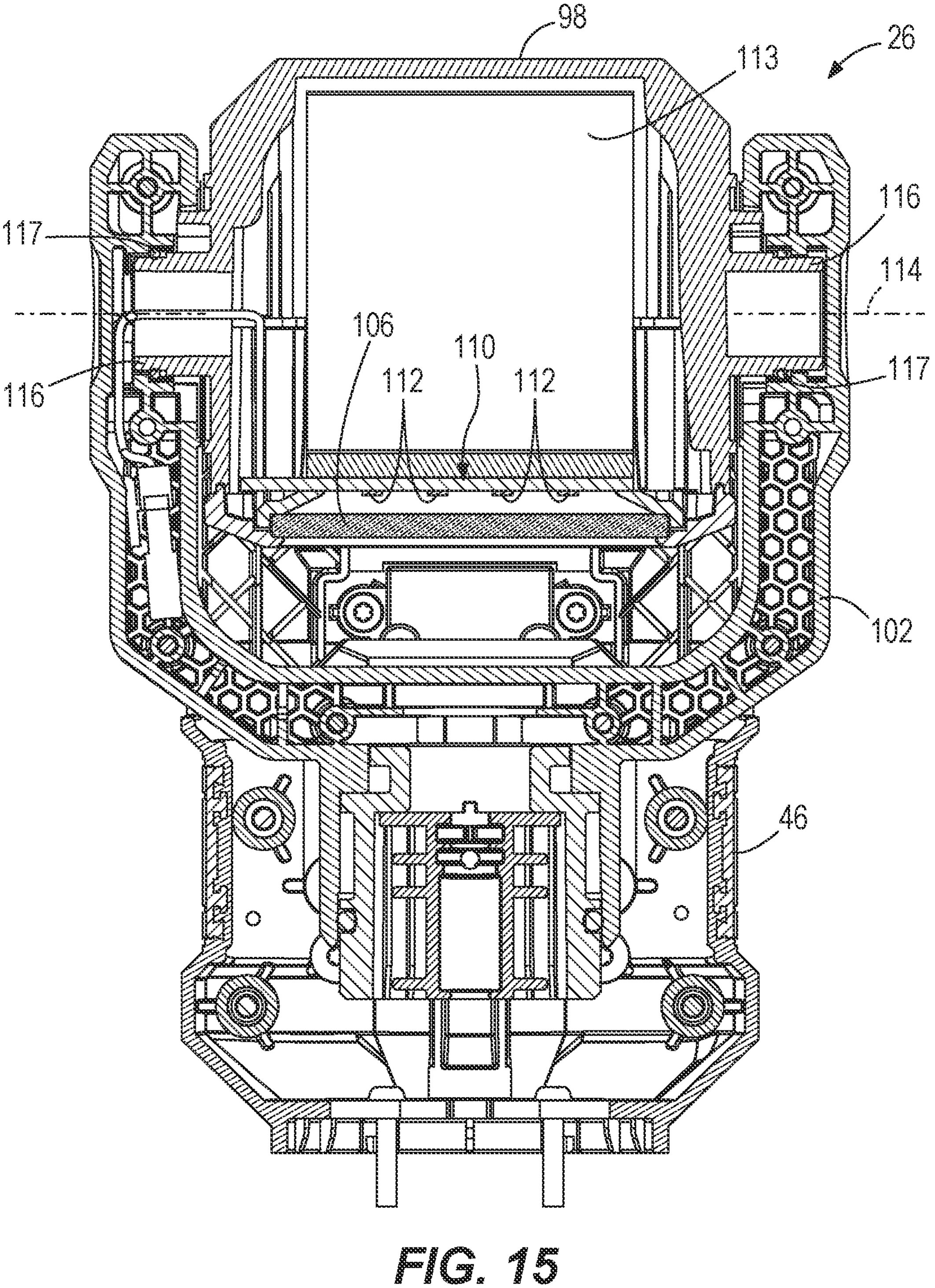
FIG. 15 is a cross-sectional view of the head assembly and the shroud.

The light head 98 is rotatable relative to the support arm 102 about a first axis 114 (which is generally horizontal when the light 10 is supported on a surface). The first axis 114 intersects the light head 98 where the support arm 102 couples to the light head 98. The light head 98 may rotate, for example, up to 180 degrees about the first axis 114. In other embodiments, the light head 98 may rotate through a larger or smaller range about the first axis 114. As shown in FIG. 15, the light head 98 includes two bosses 116 that are coaxial with the first axis 114 and coupled to the support arm 102 for rotation about the two bosses 116. A gasket 117 is positioned around each boss 116 between the bosses 116 and the support arm 102. The gaskets 117 create friction between the light head 98 and the support arm 102 to help maintain the light head 98 in any rotational position relative to the support arm 102 without requiring a positive locking engagement. In addition, a center of mass of the light head 98 (particularly the heat sink 113, the LEDs 112, and the lens 106) is designed to be on or near the first axis 114, reducing the moment about the first axis 114. In the illustrated embodiment, the gaskets 117 are O-rings. The gaskets 117 reduce the number of components (e.g., washers, springs, nuts, etc.) used to maintain the position of the light 98 compared to conventional light heads, which reduces the complexity and assembly time of the light 10. In other embodiments, the gaskets 117 may be other suitable members to create sufficient friction between the light head 98 and the support arm 102. In some embodiments, the head assembly 24 and/or the support arm 102 may include a series of detents that releasably hold the light head 98 in a finite number of positions.

Referring back to FIGS. 12A-12C, the support arm 102 may also rotate relative to the uppermost extension pole 30 about a second axis 118 (which is generally vertical when the light 10 is supported on a surface). The second axis 118 is perpendicular to the first axis 114 and is collinear with a central longitudinal axis of the extension poles 30. In some embodiments, the light 10 may include a slip ring between the support arm 102 and the uppermost extension pole 30 to maintain an electrical connection to the light head 98 as the support arm 102 rotates relative to the extension pole 30. In such embodiments, the support arm 102 (and thereby the light head 98) may continuously rotate over 360 degrees relative to the extension pole 30. In other embodiments, rotation of the support arm 102 relative to the extension pole 30 may be limited to less than 360 degrees.

Figure 13:
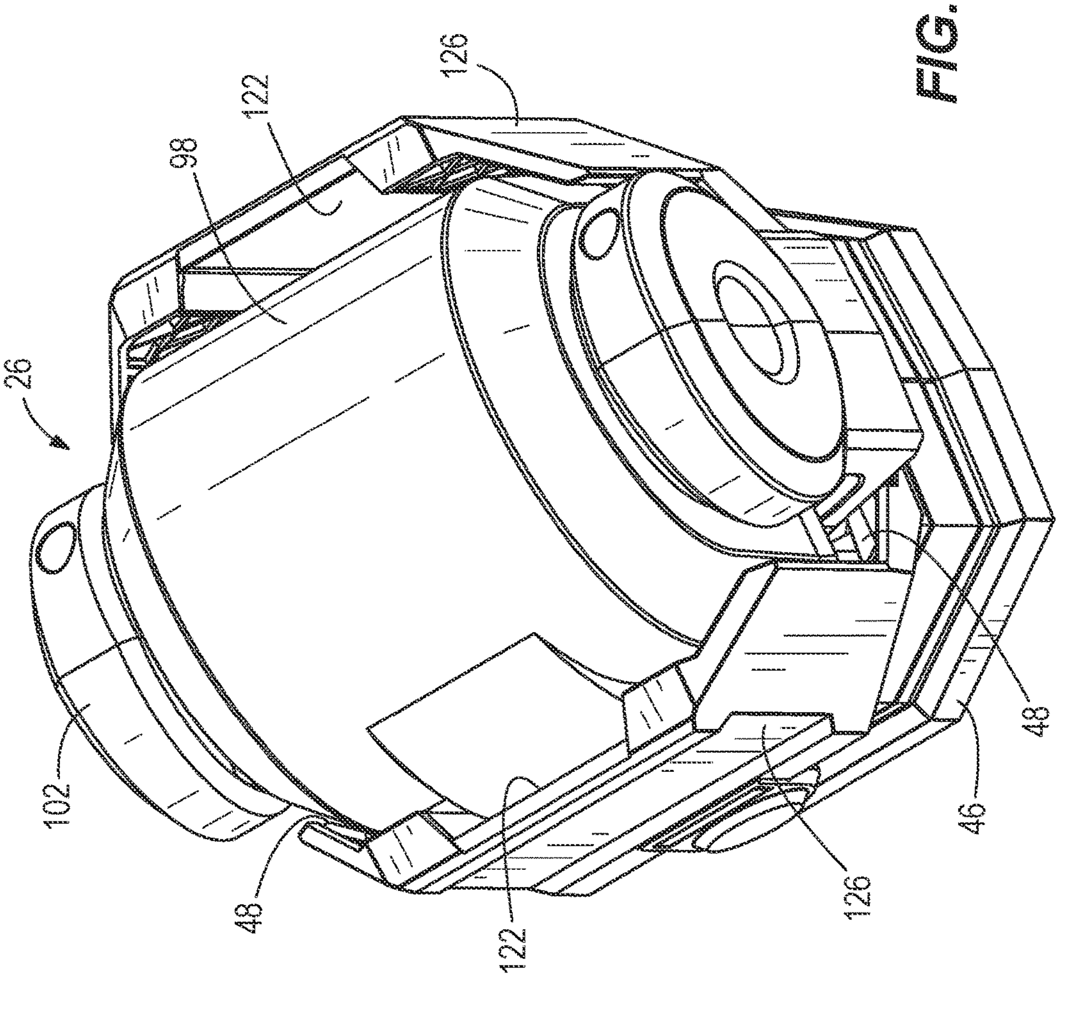
FIG. 13 is a top perspective view of the head assembly and the shroud of the stand light.

When in the collapsed position, the head assembly 26 is at least partially received in the light shroud 46. In this position, the support arm 102 is received in the cutouts 48 (FIGS. 2B and 2D) of the light shroud 46. The support arm 102 and the cutouts 48 ensure the head assembly 26 is properly aligned when lowered into the light shroud 46. The light shroud 26 also inhibits the light assembly 26 from rotating about either axis 114, 118 while in the collapsed position. As shown in FIG. 13, the head assembly 26 also faces downward (e.g., toward the body 14 and the main housing 18) when received in the light shroud 46. That is, the lens 106 and the light source 110 face a bottom of the light shroud 46 to help further protect the lens 106 and the light source 110. In alternative embodiments, more or less of the light head assembly 26 may be received in the light shroud 46. For example, in some alternative embodiments, the light head assembly 26 may engage a top portion of the light shroud 46 rather than being received within the light shroud 46.

Figure 14:
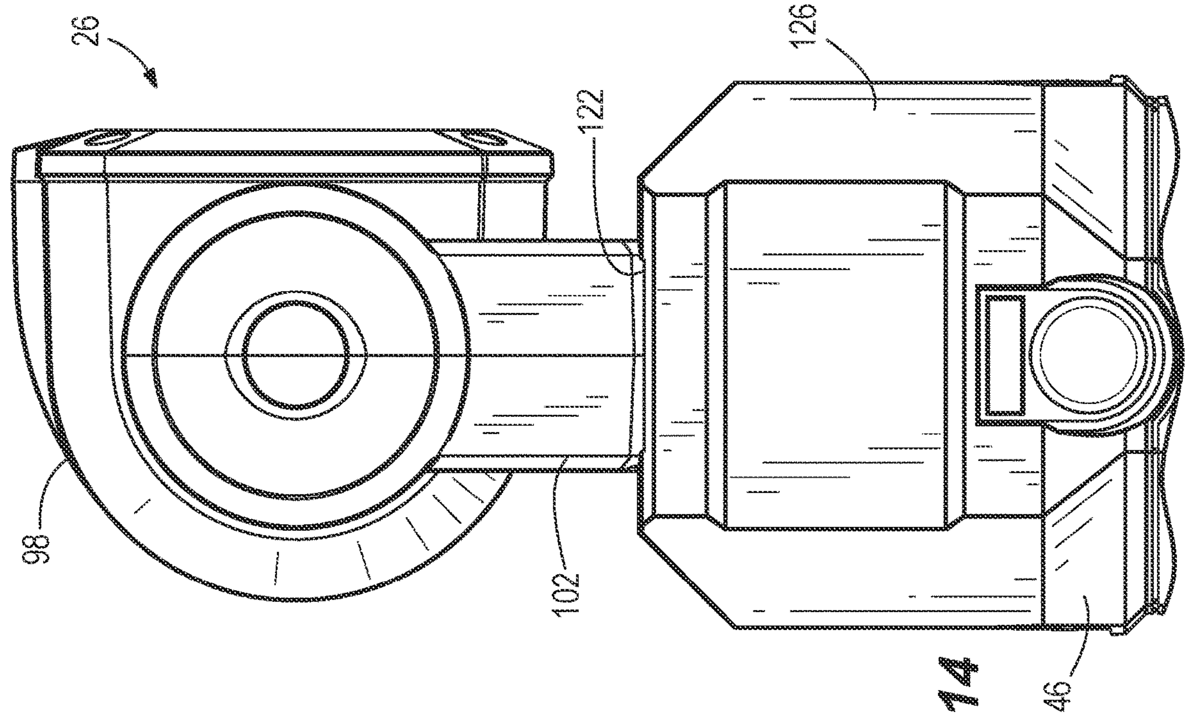
FIG. 14 is a side view of the head assembly and the shroud of the stand light, with the head assembly in a lowest resting position.

With continued reference to FIG. 13, the light shroud 46 further includes notches 122 formed on inner surfaces of sidewalls 126 of the light shroud 26 between the cutouts 48. The notches 122 are shaped and sized to receive portions of the support arm 102. Particularly, the notches 122 receive portions of the support arm 102 when the head assembly 26 is in a lowest resting position, as shown in FIG. 14. In this position, the extension poles 30 are almost fully retracted into the main center shaft 34, but the light head 98 is not received in the light shroud 46. Instead, the support arm 102 is rotated 90 degrees relative to the light shroud 46 so the light head 98 rests on top of the light shroud 46. The notches 122 provide a key-in feature that helps maintain the head assembly 26 in this position and inhibits the head assembly 26 from rotating relative to the light shroud 46.

Figure 20:
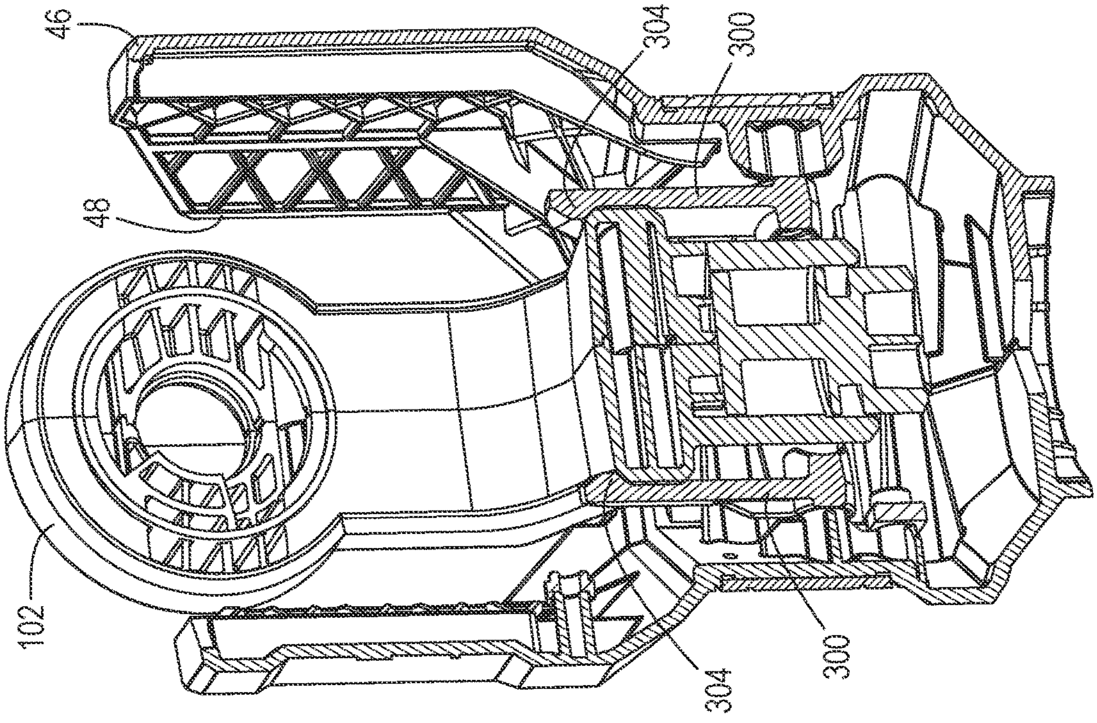
FIG. 20 is a cross-sectional view of the shroud and the head assembly with the light head removed.
Figure 19:
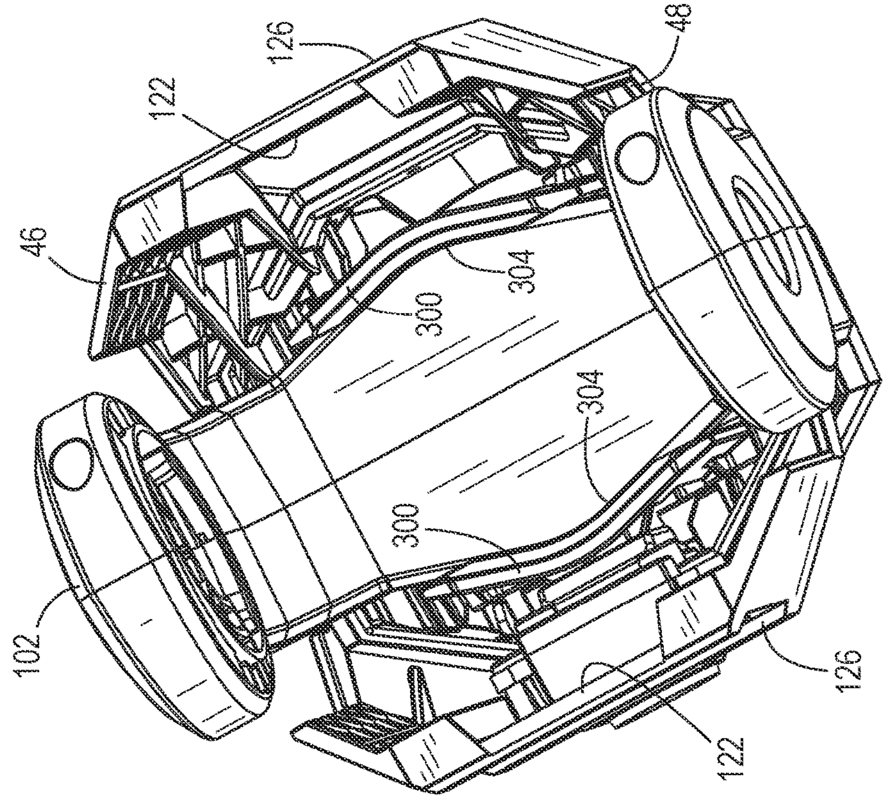
FIG. 19 is a top perspective view of the shroud and the head assembly with a light head removed.

As shown in FIGS. 19 and 20, the light shroud 46 also includes a detent mechanism to releasably hold the light head 98 in the collapsed position. The illustrated detent mechanism includes two detent arms 300 positioned on opposite sides of the support arm 102. Each arm 300 includes an enlarged lip 304 that engages the support arm 102 when the light head 98 is fully received in the light shroud 46. A user can move the light head 98 out of the shroud 46 by lifting (e.g., pulling) the light head 98 with sufficient force to temporarily deflect the detent arms 300 away from the support arm 102. Conversely, a user can move the light head 98 into the shroud 46 by lowering (e.g., pushing) the light head 98 with sufficient force to temporarily deflect the detent arms 300 away from the support arm 102 until the support arm 102 clears the enlarged lips 304 and snaps into place.

Although the invention has been described in detail with reference to certain preferred embodiments, variations and modifications exist within the scope and spirit of one or more independent aspects of the invention as described. Various features and advantage of the invention are set forth in the following claims.

What is claimed is:

1. A stand light comprising:

a body including a main center shaft and a sleeve movably supported on the main center shaft;

a head assembly supported by the body, the head assembly including a support arm, a light head coupled to the support arm, and a light source coupled to the light head; and a plurality of legs pivotally coupled to the body, the plurality of legs movable with the sleeve from a collapsed position to an extended position, in which distal ends of the plurality of legs are moved away from the body;

wherein the light head is rotatable relative to the support arm about a first axis, wherein the light head includes a boss coupled to the support arm and a gasket positioned between the boss and the support arm, and wherein the gasket maintains the light head in any rotational position relative to the support arm.

2. The stand light of claim 1, wherein the body includes an extension pole extendable out of the main center shaft.

3. The stand light of claim 2, wherein the support arm is rotatable relative to the extension pole about a second axis that is perpendicular to the first axis.

4. The stand light of claim 3, wherein the support arm is configured to continuously rotate over 360 degrees relative to the extension pole.

5. The stand light of claim 1, wherein the support arm forms a U-shaped bracket, and wherein the support arm surrounds a bottom surface and side surfaces of the light head.

6. The stand light of claim 1, wherein the light head is rotatable up to 180 degrees about the first axis.

7. The stand light of claim 1, further comprising a light shroud coupled to the main center shaft.

8. The stand light of claim 7, wherein the light shroud is configured to at least partially receive the head assembly.

9. The stand light of claim 8, wherein the light source faces toward the main center shaft when the head assembly is received within the light shroud.

10. A stand light comprising:

a telescoping body including a main center shaft and an extension pole extendable out of the main center shaft;

a head assembly supported by the extension pole, the head assembly including a light source; and a plurality of legs pivotally coupled to the telescoping body, the plurality of legs movable relative to the telescoping body from a collapsed position to an extended position, in which distal ends of the plurality of legs are moved away from the telescoping body;

wherein the telescoping body includes a detent mechanism having a first detent member coupled to an upper end of the main center shaft, and a second detent member coupled to a lower end of the extension pole and defining a recess;

wherein the first detent member engages the recess to releasably secure the extension pole in an extended position.

11. The stand light of claim 10, wherein the extension pole is maintained in any height between a collapsed position and the extended position by friction between the second detent member and the main center shaft.

12. The stand light of claim 10, wherein the extension pole is a first extension pole, and further comprising a second extension pole extendable out of the first extension pole.

13. The stand light of claim 12, wherein the detent mechanism includes a third detent member coupled to an upper end of the first extension pole, and a fourth detent member to releasably secure the second extension pole in a maximum extended position.

14. The stand light of claim 10, wherein the first detent member includes a plurality of fingers, and wherein the second detent member includes a plurality of recesses configured to receive the plurality of fingers.

15. A stand light comprising:

a body including a main center shaft and a sleeve movably supported on the main center shaft;

a head assembly supported by the body, the head assembly including a light source;

a plurality of legs pivotally coupled to the body, the plurality of legs movable with the sleeve from a collapsed position to an extended position, in which distal ends of the plurality of legs are moved away from the body; and a main housing coupled to an end of the body opposite from the head assembly, the main housing including a power port;

wherein at least one of the plurality of legs includes a recess formed in the distal end of the at least one of the plurality of legs, and wherein the recess provides clearance for an extension cord connected to the power port.

16. The stand light of claim 15, wherein the power port is an AC power input port.

17. The stand light of claim 15, wherein the main housing also includes a battery receptacle configured to receive a battery pack that powers the stand light.

18. The stand light of claim 17, wherein the main housing also includes a charging circuit, wherein the charging circuit is configured to couple the power port to the battery receptacle.

19. The stand light of claim 18, wherein the power port is configured to receive an AC power source, wherein when the AC power source is connected to the power port and the battery receptacle receives the battery pack, the AC power source is configured to charge the battery pack and power the stand light.

20. The stand light of claim 19, wherein when the AC power source is disconnected from the power port, the battery pack is configured to automatically power the stand light.

* * * * *